US008705513B2

(12) United States Patent
Van Der Merwe et al.

(10) Patent No.: US 8,705,513 B2
(45) Date of Patent: Apr. 22, 2014

(54) METHODS AND APPARATUS TO COMMUNICATIVELY COUPLE VIRTUAL PRIVATE NETWORKS TO VIRTUAL MACHINES WITHIN DISTRIBUTIVE COMPUTING NETWORKS

(75) Inventors: Jacobus Van Der Merwe, New Providence, NJ (US); Alexandre Gerber, Madison, NJ (US); Kadangode Ramakrishnan, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 590 days.

(21) Appl. No.: 12/638,643

(22) Filed: Dec. 15, 2009

(65) Prior Publication Data

US 2011/0142053 A1 Jun. 16, 2011

(51) Int. Cl.
*H04L 12/28* (2006.01)
(52) U.S. Cl.
USPC .......................................... 370/351; 370/392
(58) Field of Classification Search
None
See application file for complete search history.

(56) References Cited

U.S. PATENT DOCUMENTS

| | | | |
|---|---|---|---|
| 5,475,819 A | 12/1995 | Miller et al. | |
| 5,623,601 A | 4/1997 | Vu | |
| 6,058,426 A | 5/2000 | Godwin et al. | |
| 6,079,020 A | 6/2000 | Liu | |
| 6,205,488 B1 | 3/2001 | Casey et al. | |
| 6,636,898 B1 | 10/2003 | Ludovici et al. | |
| 6,781,982 B1 | 8/2004 | Borella et al. | |
| 6,880,002 B2 | 4/2005 | Hirschfeld et al. | |
| 6,990,666 B2 | 1/2006 | Hirschfeld et al. | |
| 7,072,346 B2 | 7/2006 | Hama | |
| 7,075,933 B2 | 7/2006 | Aysan | |
| 7,131,141 B1 | 10/2006 | Blewett et al. | |
| 7,185,106 B1 | 2/2007 | Moberg et al. | |
| 7,203,944 B1 | 4/2007 | van Rietschote | |
| 7,221,675 B2 | 5/2007 | Bryden et al. | |
| 7,225,270 B2 | 5/2007 | Barr et al. | |
| 7,257,811 B2 | 8/2007 | Hunt et al. | |
| 7,340,519 B1 | 3/2008 | Golan et al. | |
| 7,366,188 B2 | 4/2008 | Kim | |
| 7,370,164 B1 | 5/2008 | Nagarkar et al. | |
| 7,388,844 B1 | 6/2008 | Brown et al. | |

(Continued)

OTHER PUBLICATIONS

Van Der Merwe et al., "Dynamic Connectivity Management with an Intelligent Route Service Control Point," AT&T Labs, Proceedings of the 2006 SIGCOMM Workshop on Internet Network Management, held on Sep. 11-16, 2006, 6 pages.

(Continued)

*Primary Examiner* — Phirin Sam
(74) *Attorney, Agent, or Firm* — Hartman & Citrin LLC

(57) ABSTRACT

Methods and apparatus to communicatively couple virtual private networks to virtual machines within distributive computing networks are disclosed. A disclosed example method includes receiving a request to provision a virtual machine from a virtual private network, determining a host for the virtual machine within a distributive computing network, creating the virtual machine within the host, communicatively coupling the virtual machine to a virtual local area network switch within the distributive computing network, configuring a portion of a router to be communicatively coupled to the virtual machine via the virtual local area network switch by specifying an address space within the router associated with at least one of the virtual machine or the virtual private network communicatively coupled to the router, and communicatively coupling the portion of the router to the virtual private network.

19 Claims, 9 Drawing Sheets

(56) References Cited

U.S. PATENT DOCUMENTS

| | | | |
|---|---|---|---|
| 7,400,611 B2 | 7/2008 | Mukherjee et al. | |
| 7,420,958 B1* | 9/2008 | Marques | 370/351 |
| 7,564,802 B2 | 7/2009 | Andrapalliyal et al. | |
| 7,577,722 B1 | 8/2009 | Khandekar et al. | |
| 7,587,492 B2 | 9/2009 | Dyck et al. | |
| 7,603,670 B1 | 10/2009 | van Rietschote | |
| 7,616,574 B2 | 11/2009 | Previdi et al. | |
| 7,680,919 B2 | 3/2010 | Nelson | |
| 7,870,604 B1 | 1/2011 | Guichard et al. | |
| 7,912,856 B2 | 3/2011 | Hannel et al. | |
| 7,921,686 B2 | 4/2011 | Bagepalli et al. | |
| 7,937,438 B1* | 5/2011 | Miller et al. | 709/203 |
| 8,027,347 B2 | 9/2011 | Ould-Brahim | |
| 8,064,440 B2 | 11/2011 | Bhaskar | |
| 8,117,325 B1 | 2/2012 | Wu | |
| 8,117,338 B2 | 2/2012 | Ould-Brahim | |
| 2002/0181477 A1 | 12/2002 | Mo et al. | |
| 2003/0016672 A1 | 1/2003 | Rosen et al. | |
| 2003/0051021 A1 | 3/2003 | Hirschfeld et al. | |
| 2003/0188001 A1 | 10/2003 | Eisenberg et al. | |
| 2004/0148439 A1 | 7/2004 | Harvey et al. | |
| 2005/0066053 A1 | 3/2005 | McDysan | |
| 2005/0138204 A1 | 6/2005 | Iyer et al. | |
| 2005/0251802 A1 | 11/2005 | Bozek et al. | |
| 2006/0010176 A1 | 1/2006 | Armington | |
| 2006/0101189 A1 | 5/2006 | Chandrasekaran et al. | |
| 2006/0165087 A1 | 7/2006 | Page et al. | |
| 2006/0168279 A1 | 7/2006 | Lee et al. | |
| 2006/0168321 A1 | 7/2006 | Eisenberg et al. | |
| 2006/0195715 A1 | 8/2006 | Herington | |
| 2006/0251088 A1 | 11/2006 | Thubert et al. | |
| 2007/0019676 A1* | 1/2007 | Kompella | 370/468 |
| 2007/0133577 A1 | 6/2007 | Dong | |
| 2007/0140250 A1 | 6/2007 | McAllister et al. | |
| 2007/0140251 A1 | 6/2007 | Dong | |
| 2007/0195800 A1 | 8/2007 | Yang et al. | |
| 2007/0217419 A1 | 9/2007 | Vasseur | |
| 2007/0280241 A1 | 12/2007 | Verma | |
| 2008/0002697 A1 | 1/2008 | Anantharamaiah et al. | |
| 2008/0034365 A1 | 2/2008 | Dahlstedt | |
| 2008/0043764 A1* | 2/2008 | Ishizaki et al. | 370/401 |
| 2008/0049752 A1 | 2/2008 | Grant | |
| 2008/0065826 A1 | 3/2008 | Recio et al. | |
| 2008/0080396 A1 | 4/2008 | Meijer et al. | |
| 2008/0080497 A1 | 4/2008 | Meijer et al. | |
| 2008/0080517 A1 | 4/2008 | Roy et al. | |
| 2008/0080526 A1 | 4/2008 | Gounares | |
| 2008/0080552 A1 | 4/2008 | Gates et al. | |
| 2008/0082546 A1 | 4/2008 | Meijer et al. | |
| 2009/0144393 A1* | 6/2009 | Kudo | 709/218 |
| 2010/0111093 A1 | 5/2010 | Satterlee et al. | |
| 2010/0115604 A1 | 5/2010 | Gerber et al. | |
| 2010/0329265 A1* | 12/2010 | Lapuh et al. | 370/395.53 |
| 2011/0075674 A1* | 3/2011 | Li et al. | 370/401 |
| 2011/0110370 A1* | 5/2011 | Moreno et al. | 370/392 |
| 2011/0119381 A1* | 5/2011 | Glover et al. | 709/226 |
| 2011/0134931 A1* | 6/2011 | Merwe et al. | 370/401 |
| 2011/0238775 A1 | 9/2011 | Wu et al. | |
| 2011/0321041 A1 | 12/2011 | Bhat et al. | |
| 2012/0054367 A1 | 3/2012 | Ramakrishnan et al. | |
| 2012/0297073 A1* | 11/2012 | Glover et al. | 709/226 |
| 2013/0246626 A1* | 9/2013 | Glover et al. | 709/226 |

OTHER PUBLICATIONS

Van Der Merwe et al., PowerPoint presentation of "Dynamic Connectivity Management with an Intelligent Route Service Control Point," AT&T Labs, Proceedings of the 2006 SIGCOMM Workshop on Internet Network Management, held on Sep. 11-16, 2006, 14 pages.

U.S. Appl. No. 12/262,675, filed Oct. 31, 2008, entitled, "Methods and Apparatus to Dynamically Control Connectivity Within Virtual Private Networks," 24 pages.

Brady, Kevin F., "Cloud Computing—Is It Safe for IP?" Portfolio Media, Inc., http://www.law360.com/print_article/113790 on Aug. 27, 2009. Retreived from the internet on Sep. 3, 2009, 8 pages.

"Amazon Elastic Computing Cloud," http://aws.amazon.com/ec2. Retrieved from the Internet on Dec. 23, 2009, 8 pages.

Armbrust et al., "Above the Clouds: A Berkeley View of Cloud Computing," Technical Report UCB/EECS-2009-28, EECS Department, University of California, Berkeley, February Technical Report No. UCB/EECS-2009-28, http://www.eecs.berkeley.edu/Pubs/TechRpts/2009/EECS-2009-28.html, Feb. 10, 2009, 25 pages.

Clark et al., "Live Migration of Virtual Machines," in Proceedings of NSDA, http://www.cl.cam.ac.uk/research/srg/netos/papers/2005-migration-nsdi-pre.pdf, May 2005, 14 pages.

Duffield et al., "Resource management with hoses: point-to-cloud services for virtual private networks," IEEE ACM Transactions on Networking, 2002, 16 pages.

Cohen, Reuven, "Elasticvapor Blog: Virtual Private Cloud," www.elasticvapor.com/2008/05/virtual-private-cloud-vpc.htm, May 8, 2008, 2 pages.

"Goggle App Engine" hthttp://code.google.com/appengine/. Retrieevd from the Internet on Dec. 23, 2009, 4 pages.

Nelson et al., "Fast Transparent Migration for Virtual Machines," In ATEC '05 Proceedings of the annual conference on USENIX Annual Technical Conference, 2005, 4 pages.

Ramakrishnan et al., "Live Data Center Migration Across WANs: A Robust Cooperative Context Aware Approach," in INM '07: Proceedings of the SIGCOMM workshop on Internet network management, Aug. 27-31, 2007, 6 pages.

Ruth et al., "Autonomic Live Adaptation of Virtual Computational Environments in a Multi-Domain Infrastructure," in ICAC '06: Proceedings of the 2006 IEEE International Conference of Autonomic Computing, 2006, 10 pages.

Sundararaj et al., "Towards Virtual Networks for Virtual Machine Grid Computing," in VM '04: Proceedings of the 3rd conference on Virtual Machine Research and Technology Symposium, 2004, 14 pages.

U.S. Notice of Allowance dated Feb. 20, 2013 in U.S. Appl. No. 12/862,382.

U.S. Notice of Allowance dated Feb. 20, 2013 in U.S. Appl. No. 12/262,615.

U.S. Office Action dated May 11, 2010 in U.S. Appl. No. 12/262,675.

U.S. Office Action dated Oct. 4, 2010 in U.S. Appl. No. 12/262,675.

U.S. Office Action dated Apr. 15, 2011 in U.S. Appl. No. 12/262,675.

U.S. Notice of Allowance dated Oct. 17, 2011 in U.S. Appl. No. 12/262,675.

U.S. Office Action dated Mar. 13, 2012 in U.S. Appl. No. 12/262,615.

U.S. Office Action dated Aug. 30, 2012 in U.S. Appl. No. 12/862,382.

Aggarwal, et al., "EndRE: An End-System Redundancy Elimination Service for Enterprises," Mar. 30, 2010, 14 pages.

Wood, T., "CloudNet: A Platform for Optimized WAN migration of Virtual Machines," Technical Report, University of Massachusetts, CS Dept., Jan. 20, 2010, 15 pages.

Cisco, "Cisco Active Network Abstraction," http://www.cisco.com/go/ana, Apr. 26, 2006, 1 page.

Juniper, "JUNOS Software, Configuration and Diagnostic Automation Guide," http://www.juniper.net, Oct. 16, 2009, 492 pages.

Cisco, "Virtual Machine Mobility with vmware Vmotion and Cisco data center interconnect technologies," http://www.cisco.com/en/US/solutions/collateral/ns340/ns224/ns836/white_paper_c11-557822.pdf, Sep. 1, 2009, 17 pages.

Anand, Ashok et al., "SmartRE: An Architecture for Coordinated Network-Wide Redundancy Elimination," SIGCOMM Comput. Commun. Rev., 39(4); 87-98, Aug. 17, 2009, 12 pages.

Bradford, Robert et al., "Live Wide-Area Migration of Virtual Machines Including Local Persistent State," in Proceedings of the 3rd International Conference on Virtual Execution Environments, pp. 169-179, San Diego, California, Jun. 13, 2007, ACM, 11 pages.

Chen, Xu et al., "ShadowNet: A Platform for Rapid and Safe Network Evolution," in USENIX Annual Technical Conference, Jun. 14, 2009, 14 pages.

Cully, Brendan et al., "Remus: High Availability via Asynchronous Virtual Machine Replication," in NSDI 08, Apr. 16, 2008, 25 pages.

DRBD, Software Development for High Availability Clusters, http://drbd.org/, Oct. 2008, 1 page.

(56) References Cited

OTHER PUBLICATIONS

Harney, Eric et al., "The Efficacy of Live Virtual Machine Migrations Over the Internet," in Proceedings of the 3rd International Workshop on Virtualization Technology in Distributed Computing, pp. 1-7, Reno, Nevada, Nov. 12, 2007, ACM, 7 pages.

Huang, Wei et al., "High Performance Virtual Machine Migration with RDMA Over Modern Interconnects," in Proceedings of the 2007 IEEE International Conference on Cluster Computing, pp. 11-20, IEEE Computing Society, Sep. 17, 2007, 10 pages.

Microsoft, "Microsoft Hyper-V Server," www.microsoft.com/hyper-v-server, 2008, 2 pages.

Jin, Hai et al., "Live Virtual Machine Migration with Adaptive Memory Compression," in Cluster, Sep. 3, 2009, 28 pages.

Milos, G. et al., "Satori: Enlightened Page Sharing," in USENIX Annual Technical Conference, Jun. 14, 2009, 14 pages.

Morris, R., "Scalable TCP Congestion Control," in INFOCOM 2000, Nineteenth Annual Joint Conference of the IEEE Computer and Communications Societies, Proceedings, IEEE, vol. 3, pp. 1176-1183, Mar. 26, 2000, 8 pages.

Carnegie Mellon University School of Computer Science, "Sliding Window Based Rabin Fingerprint Computation Library," www.cs.cmu.edu/~hakim/software, Dec. 2, 2005, 1 page.

spec.org, "The spec java server benchmark," http://spec.org/jbb2005/, Jun. 16, 2005, 2 pages.

Spring, Neil et al., "A Protocol-Independent Technique for Eliminating Redundant Network Traffic," SIGCOMM Comput. Commun. Rev., 30(4): 87-95, Aug. 28, 2000, 9 pages.

TPC, The TPC-W Benchmark, http://www.tpc.org/tpcw, Feb. 1, 2000, 1 page.

Travostino, Franco et al., "Seamless Live Migration of Virtual Machines over the MAN/WAN," Future Generation Computer Systems, 22(8):901-907, Oct. 2006 issue (posted online Jun. 7, 2006), 10 pages.

Waldspurger, Carl A., "Memory Resource Management in Vmware ESX Server," in OSDI '02: Proceedings of the 5th Symposium on Operating Systems Design and Implementation, pp. 181-194, New York, NY, Dec. 9, 2002, ACM, 14 pages.

Wood, T. et al., "The Case for Enterprise Ready Virtual Private Clouds," in Proceedings of the USENIX Workshop on Hot Topics in Cloud Computing (HotCloud, San Diego, CA), Jun. 14, 2009, 5 pages.

VMWARE, "VMWare vSphere: VMware vMotion for Live Migration of Virtual Machines," http://www.vmware.com/virtualization/virtual-machine.html, 2 pages, Aug. 10, 2010.

VMWARE, "Virtualization Basics: Virtual Machines, Virtual Server, Virtual Infrastructure," First published on Nov. 12, 2009, as archived at http://web.archive.org/web/20091112211022/http:www.vmware.com/virtualization/virtual-machine.html, 2 pages.

Rosen, et al., "BGP/MPLS IP Virtual Private Networks (VPNs)," Network Working Group, Request for Comments: 4364, The Internet Society, Feb. 2006, 47 pages.

U.S. Office Action dated Oct. 4, 2012 in U.S. Appl. No. 12/262,615.

Cisco: IPv6 over MPLS Cisco IPv6 Provider Edge Router (6PE) Cisco IPv6 VPN Provider Edge Router (6VPE); 2006.

\* cited by examiner

METHODS AND APPARATUS TO COMMUNICATIVELY COUPLE VIRTUAL PRIVATE NETWORKS TO VIRTUAL MACHINES WITHIN DISTRIBUTIVE COMPUTING NETWORKS

FIELD OF THE DISCLOSURE

This disclosure relates generally to cloud computing and, more particularly, to methods and apparatus to communicatively couple virtual private networks to virtual machines within distributive computing networks.

BACKGROUND

Cloud computing platforms are becoming popular with clients and customers by providing flexible, on demand resources at a relatively low cost. A cloud computing network, also known as a distributive computing network, enables clients to manage web-based applications and/or data resources by dynamically leasing computational resources from service providers. These web-based applications and/or data resources may be used by customers of the clients, individuals associated with the clients, and/or by the clients. This dynamic leasing of computational resources creates the appearance and function of a distributive computing network and, thus, can be referred to as virtualization of a computer network. Cloud computing platforms utilize virtualization of network and/or computing resources. Accordingly, new resources provisioned for a client may be quickly added as needed within short periods of time by a service provider allocating an additional portion of shared resources to the client. Additionally, cloud computing virtualization enables service providers to dynamically multiplex resources among multiple clients without dedicating individual physical resources to each client.

DETAILED DESCRIPTION

Figure 1:
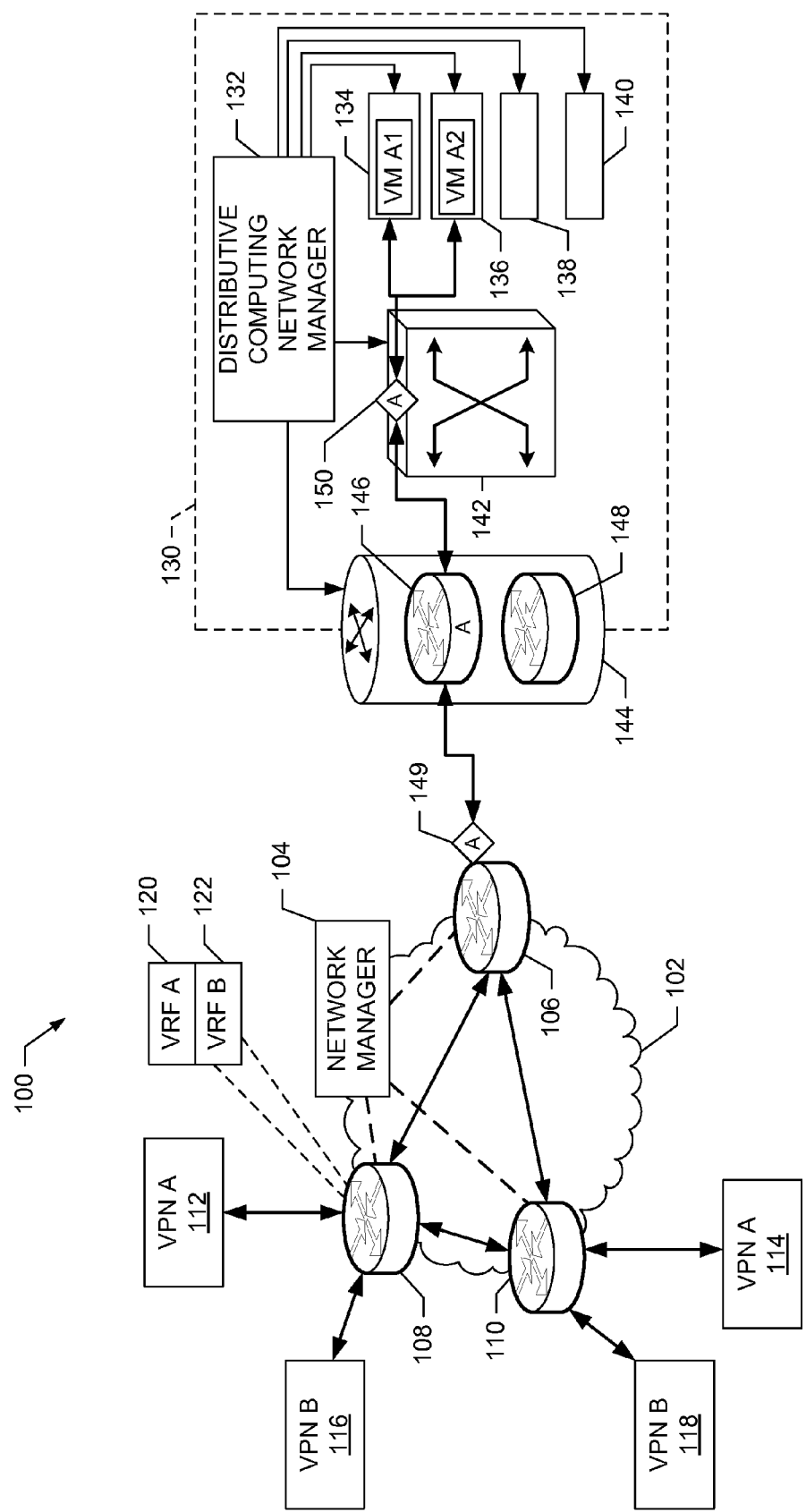
FIG. 1 is a schematic illustration of an example communication system including client virtual private networks (VPNs) and a distributive computing network.

Example methods, articles of manufacture, and apparatus to communicatively couple virtual private networks (VPNs) to virtual machines within distributive computing networks are disclosed. A disclosed example method includes receiving a request to provision a virtual machine from a virtual private network and determining a host for the virtual machine within a distributive computing network. The example method further includes creating the virtual machine within the host, communicatively coupling the virtual machine to a virtual local area network switch within the distributive computing network, configuring a portion of a router to be communicatively coupled to the virtual machine via the virtual local area network switch by specifying an address space within the router associated with at least one of the virtual machine or the virtual private network communicatively coupled to the router, and communicatively coupling the portion of the router to the virtual private network.

A disclosed example apparatus includes a distributive computing network manager to receive a request to provision a virtual machine from a VPN, a resource manager to determine a host for the virtual machine within a distributive computing network associated with the distributive computing network manager, and a virtual machine generator to create the virtual machine within the host. The example apparatus further includes a virtual machine coupler to communicatively couple the virtual machine to a virtual local area network switch within the distributive computing network and a router manager to configure a portion of a router to be communicatively coupled to the virtual machine via the virtual local area network switch by specifying an address space within the router associated with at least one of the virtual machine or the virtual private network communicatively coupled to the router. The example apparatus also includes a distributive computing network interface to communicatively couple the portion of the router to the virtual private network.

Distributive computing networks (e.g., cloud computing networks) enable subscribing clients to flexibly lease virtual servers based on the usage by customers and/or individuals associated with the client. The distributive computing networks are typically used by customers for software-as-a-service (SaaS) web-based front-end applications (e.g., online retail businesses) and/or infrastructure-as-a-service (IaaS) data processing applications. Distributive computing networks may also be used by customers for computing-as-a service (CaaS) applications and storage-as-a-service database management applications. The distributive computing networks are managed by service providers who may allocate resources among the distributive computing networks based on usage. These resources may be allocated as virtual machines that utilize the computing resources of one or more host servers. The service providers may assign Internet Protocol (IP) addresses to each virtual machine and/or distributive computing network resource. However, the assigned IP addresses are outside the control of subscribing clients.

Typical subscribing clients may not need to control the IP address associated with their virtual machines because service providers may manage the routing of traffic within distributive computing networks. Service providers may manage routing by assigning virtual machines one or more dynamic IP addresses that may change as usage conditions change, at periodic times, as hosting servers change, etc. To enable subscribing clients to access the virtual machine in an environment with dynamic IP addresses, the virtual machine may be assigned a Uniform Resource Locator (URL) that may be used to access the virtual machine regardless of the IP address assigned to the virtual machine by accessing a lookup table and cross-referencing the URL to the IP address. The URL may be translated by the service provider to the current IP address and enables clients to manage and/or advertise locations of their applications hosted by the virtual machines regardless of the IP addresses assigned to the virtual machines.

Generally, distributive computing network service providers manage storage and/or computing resources. Customers and/or clients may utilize the storage and/or computing resources, but are not provided the functionality by these service providers to control network resources within the distributive computing network and/or network resources linking the customer and/or client to the distributive computing network. The customers and/or clients may include enterprise clients that manage and/or are associated with a virtual private network. However, some enterprise clients may require a distributive computing network service provider to link applications operating within the client site to virtual machines hosted by distributive computing network using an IP address and/or an IP address space associated with the enterprise client. Furthermore, many enterprise clients may utilize VPNs that utilize static IP addressing for routing Internet and/or Intranet based communications. For enterprise clients that may implement a dynamic network (e.g., a VPN and/or a virtual local area network (VLAN)), typical connections to virtual machines may require the enterprise clients to constantly map their network resources to the corresponding virtual machines. As a result, the additional resources used by an enterprise client to constantly update network mapping to virtual machines and/or to maintain security associated with the mapping may exceed resources saved by the enterprise client utilizing the virtual machines.

Currently, dynamic IP addresses implemented within distributive computing networks create a separation between the address space of a client and IP addresses assigned to a virtual machine. While this separation isolates client resources from being viewed by a third party, this separation increases configuration complexity when a client deploys services that may communicate between the enterprise VPN address space and virtual machines operating within the distributive computing network IP address space. Additionally, the IP address separation requires a client to be responsible for independently arranging for network traffic isolation and/or bandwidth guarantees with a service provider of the distributive computing network.

Further, this address space separation may lead to security concerns for an enterprise client because the enterprise client may need to utilize IP addresses on the public Internet provided by the service provider to link application components in the distributive computing network to a network of the client. The client may implement security for the associated virtual machine and the VPN enterprise network of the client via firewall rules. However, these rules may be difficult to manage in dynamically changing enterprise environments.

The example methods, articles of manufacture, and apparatus described herein enable clients to manage IP addresses and/or resources associated with assigned virtual machines that are communicatively coupled to VPNs associated with the clients. The example methods, articles of manufacture, and apparatus utilize a distributive computing network manager (e.g., service provider) to create virtual local area networks (VLANs) within distributive computing networks to isolate virtual machines associated with VPNs of subscribing clients. The distributive computing network manager may also manage referencing of IP address space associated with a virtual machine to routers coupled to VPNs.

Additionally, the distributive computing network manager may assign a VLAN to each virtual machine coupled to a VPN. In this manner, only network traffic from within a VPN associated with a client and/or a customer may access a corresponding virtual machine. Thus, the distributive computing manager extends the security of a VPN to a distributive computing network enabling a client to exclusively access resources hosted by a service provider. The distributive computing network manager may also manage the advertisement of IP address space assigned to a virtual machine to a subscribing VPN. Additionally, the distributive computing network manager may manage the migration of a virtual machine to a different location within the distributive computing network without affecting and/or disrupting traffic between the client and the virtual machine. Further, because the client has control of the virtual machine within the distributive computing environment, the client may configure applications to co-operate between the VPN and the virtual machine without having to constantly update mapping between the VPN and the virtual machine.

In the interest of brevity and clarity, throughout the following disclosure, reference will be made to an example communication system 100 of FIG. 1. However, the methods, articles of manufacture, and apparatus described herein to communicatively couple VPNs to virtual machines within distributive computing networks are applicable to other types of networks constructed using other network technologies, topologies and/or protocols.

FIG. 1 illustrates the example communication system 100 that includes a switching network 102. The switching network 102 may include any multiprotocol label switching (MPLS) to implement a layer 3 VPN, a Virtual Private LAN Service (VPLS) to implement a Layer 2 VPN across a Wide Area Network (WAN), and/or any other type of switching service to implement a VPN. The switching network 102 is managed by a network manager 104 that configures routing tables for routers 106-110. The example switching network 102 may include any type of network managed by a service provider for routing packet-based communications (e.g., data) between computing resources associated with client sites. In some examples, the switching network 102 may be implemented by multiple service providers.

The routers 106-110 of the illustrated example route packet-based communications between systems and networks utilizing a VPN A located at a first location 112 and a second location 114 corresponding to a subscribing client A, and systems and networks utilizing a VPN B located at a first location 116 and a second location 118 corresponding to a subscribing client B. Additionally, the routers 106-110 may route other packet-based communications to and/or from other clients and/or customers (not shown) and other switching networks (not shown). The routers 106-110 may be provider edge (PE) routers that may be communicatively coupled to each other and/or the VPNs at the locations 112-118 via any number and/or type(s) of communication paths (not shown) that allow any particular router 106-110 to communicate with at least some, but not necessarily all of, the other routers 106-110. Furthermore, each of the VPNs at the locations 112-118 may include customer edge (CE) routers (not shown) that may route packet-based communications between computing sources within the respective VPNs at the locations 112-118. The VPNs at the locations 112-118 may be implemented by any type of virtualized network that communicatively couples computing resources from one or more client sites together.

For each VPN at the respective location 112-118 implemented by the switching network 102, each of the example routers 106-110 of FIG. 1 has a corresponding VPN routing and forwarding (VRF) table. For example, for the VPN A at the locations 112 and 114, the routers 106-110 have a VRF table A 120. For the VPN B at the locations 116 and 118, the routers 106-110 have a VRF table B 122. For brevity, only the VRF tables A 120 and B 122 associated with the router 108 are shown. However, the routers 106 and 110 each include the VRF tables A 120 and B 122. The VRF tables A 120 and B 122 are used by the routers 106-110 to route and/or forward a packet received at a particular router 106-110 toward its final destination. In general, when a packet is received at the router 106-110 from a router associated with a particular VPN at the locations 112-118, the router 106-110 uses the final destination identified in the packet to perform a query of the VRF table associated with that VPN. Based on a result of the query, the routers 106-110 determine how the packet is to be routed or forwarded within the switching network 102 and/or delivered to a particular CE router within another VPN and/or client site.

The example network manager 104 of FIG. 1 manages the VRF A 120 and/or the VRF B 122 in the routers 108 and 110 for the corresponding VPNs at the locations 112-118. The example network manager 104 may include a network configuration management system that configures and/or creates VRF tables for VPNs (e.g., to manage the control plane of the routers 106-110). Additionally, the network manager 104 may include a route reflector, route server, and/or a route controller that writes and rewrites route targets associated with VPN routes so that a client VPN can be dynamically connected to a selected VRF table (e.g., to manage the route within the routers 106-110). In other examples, the route reflector, route server, and/or route controller may be separate from the network manager 104 (e.g., the route reflector 202 described in conjunction with FIG. 2). In some examples, the network manager 104 may pre-configure the routers 106-110 with one or more sets of VRF tables. The one or more sets of VRF tables may be unspecified and/or unused by the routers 106-110 until the network manager 104 selects a set to couple a client VPN to a virtual machine (e.g., virtual machine VM A1 in a distributive computing network 130).

For example, the network manager 104 may receive routing instructions from the client A regarding a new VPN A site. The network manager 104 may then update (e.g., configure) the VRF A 120 to include the new VPN A site. The network manager 104 may then rewrite route targets within the routers 106-110 associated with VPN A routes to dynamically couple the new VPN A site to the locations 112 and 114. The example network manager 104 may publish one or more interfaces associated with routers for forwarding packets to other switching network or distributive computing networks. Additionally, the network manager 104 may be communicatively coupled to each of the routers 106-110 via any type of communication path that may include one or more intermediate networks and/or nodes as indicated by the dashed lines.

By sending, for example, Border Gateway Protocol (BGP) route advertisements, each of the example routers 106-110 of FIG. 1 publishes and/or exports information concerning routes advertised by CE router(s) within the VPNs at the locations 112-118 that are communicatively coupled to the routers 106-110. Isolation between the VPNs A and B is achieved via VRF tables (e.g., the VRF A 120 and the VRF B 122), and/or import policies. Specifically, all routes of a particular VPN are tagged with a route target parameter and/or value associated with the VPN. For example, when the example router 108 sends a BGP advertisement containing information regarding routers within the VPN A at the first location 112 that is communicatively coupled to the router 108, the BGP advertisement includes a route target that is associated with the VPN A. Based on received BGP advertisements, the example routers 106-110 of FIG. 1 build, compile, update, maintain and/or construct a VRF table (e.g., the VRF A 120) for each VPN. Specifically, when the example routers 106-110 receive BGP advertisements tagged with a route target associated with a particular VPN, they import only those routes into the VRF table associated with that VPN, as dictated by the VPN's import policy.

To facilitate sharing of routing information among the example routers 106-110, the example network manager 104 of FIG. 1 may include any number of route reflectors, route servers, intelligent route reflectors, and/or intelligent route service control points. Because not all of the example routers 106-110 are necessarily communicatively coupled in a full mesh topology (for example, when at least one router 106-110 does not have a direct communication path to another router 106-110), the example network manager 104 of FIG. 1 forwards BGP advertisements among the routers 106-110. By forwarding each received BGP advertisement, the example network manager 104 enables each of the routers 106-110 to build, compile and/or construct a VRF table for each VPN that can be used by the router 106-110 to route data from any CE router of a particular VPN to any other CE router within the VPNs A and/or B, even if such routing of data requires use of one or more intervening routers 106-110.

In the example of FIG. 1, the communication system 100 includes the distributive computing network 130 that is communicatively coupled to the switching network 102 via the router 106. The distributive computing network 130 may include any type of virtualized network that includes servers that provide resources to clients and/or customers based on, for example, usage requirements, bandwidth, processor efficiency, etc. In some examples, the distributive computing network 130 may include a cloud computing network. The example distributive computing network 130 is managed by a distributive computing network manager 132 to control the creation, allocation, and/or distribution of resources within the distributive computing network 130. The distributive computing network 130 further includes servers 134-140 for hosting computing resources, a virtual local area network (VLAN) switch 142, a router 144 that includes logical routers 146 and 148, and virtual machines VM A1 and VM A2 hosted respectively by the servers 134 and 136. Each of the servers 134-140 may be located within a single site location or, alternatively, may be located at a plurality of site locations within the distributive computing network 130. Additionally, the distributive computing network 130 may include other routers, logical routers, servers, VLANs, and/or switching networks that may be distributed across one or more sites located at different physical locations.

The example communication system 100 of FIG. 1 shows the VPN A at the locations 112 and 114 communicatively coupled to virtual machines VM A1 and VM A2 within the distributive computing network 130. The router 106 includes an interface 149 that communicatively couples the VPN A at the locations 112 and 114 to resources (e.g., the virtual machines VM A1 and A2 hosted respectively by servers 134 and 136) within the distributive computing network 130. The interface 149 may communicatively couple the VPN A at the locations 112 and 114 to the virtual machines VM A1 and A2 by remapping the route targets associated with the VPN A in the VRF A 120 to the virtual machines VM A1 and A2 and transmitting BGP advertisements to the routers 108 and 110 with the remapped route target. The interface 149 may be coupled to a VRF table which includes a routing entry that forwards packets from multiple destinations associated with the VPN A to a single (or few) network locations within the distributive computing network 130. The example router 106 may include additional interfaces and/or endpoints that reference other distributive computing networks and/or other switching networks.

The example VLAN switch 142 communicatively couples common resources together that may be distributed across each of the servers and/or by isolating resources associated with different clients that may be shared on a single router. The VLAN switch 142 implements one or more VLANs that may communicatively couple virtual machines to VPNs. For example, the virtual machines VM A1 VM A2 may be a group of resources distributed across the servers 134 and 136. The example VLAN switch 142 couples the virtual machine VM A1 and VM A2 on the respective servers 134 and 136 together so that any computing resource within the VPN A at the location(s) 112 and/or 114 may access an application, data, and/or a processing resource by accessing the virtual machine VM A1, VM A2, and/or a combination of the virtual machines VM A1 and VM A2.

The virtual machines VM A1 and/or VM A2 may include any type of hardware virtual machine that may share underlying hardware resources with each resource operating a separate operating system. The virtual machines VM A1 and/or VM A2 may also include any type of application virtual machine that may operate different client applications on a single operating system. A virtual machine (e.g., the virtual machine VM A1) may be hosted by a single server (e.g., the server 134) and/or by multiple servers that may be located across different physical locations. Each virtual machine may be assigned an IP address and/or a logical interface of each virtual machine may be assigned a media access control (MAC) address.

The example distributive computing network manager 132 may assign an IP address and/or an IP address space to each of the virtual machines VM A1 and/or VM A2 or, alternatively, may assign a single IP address and/or IP address space to the virtual machines VM A1 and VM A2. Further, the distributive computing network manager 132 may assign resources, application types, application images, access control, bandwidth, operating system types, a server location, and/or any other type of distributive computing parameter to one or more servers upon a request to provision and/or allocate resources from a client. In other examples, the distributive computing network manager 132 may assign a MAC address to the virtual machines VM A1 and/or VM A2.

The distributive computing network manager 132 may also partition resources within the router 144 by creating a logical router (e.g., the logical router 146). The logical router 146 functions as a customer edge router for the VPN within the distributive computing network 130. In this manner, the client A VPN sites (e.g., the locations 112 and 114) are communicatively coupled to resources in the distributive computing network 130 so that traffic from the client locations 112 and 114 with destination addresses associated with the virtual machines VM A1 and/or VM A2 can reach these virtual machines. These destination addresses correspond to the IP addresses of the virtual machines VM A1 and VM A2 and/or may correspond to a MAC address assigned to an interface of the virtual machines VM A1 and VM A2. The logical router 146 may also include filtering and/or firewalling functions to restrict access to resources within the distributive computing network 130. For example, the logical router 146 may include a source address filter so that only packets that include a source address associated with the VPNs at the locations 112 and 114 may be forwarded to the virtual machines VM A1 and VM A2.

The distributive computing network manager 132 may also update VRF tables within the router 144 to include identification values of network paths within the VLAN switch 142 that correspond to routes to virtual machines VM A1 and VM A2. A VLAN controller (not shown) may manage the physical and/or logical setup of a network path from the servers 134-140 to the corresponding logical routers 146 and 148. For example, a VLAN network path 150 from the virtual machine VM A1 may be assigned an identification value of PATH1. Further, the virtual machine VM A1 may be assigned an IP address ADDR01. The distributive computing network manager 132 may create a VRF table via the logical router 146 that indicates any packets originating from the VPN A at the locations 112 and 114 with a destination address of ADDR01 should be forwarded to the virtual machine VM A1 on the server 134 via the VLAN network path PATH1 150.

Figure 2:
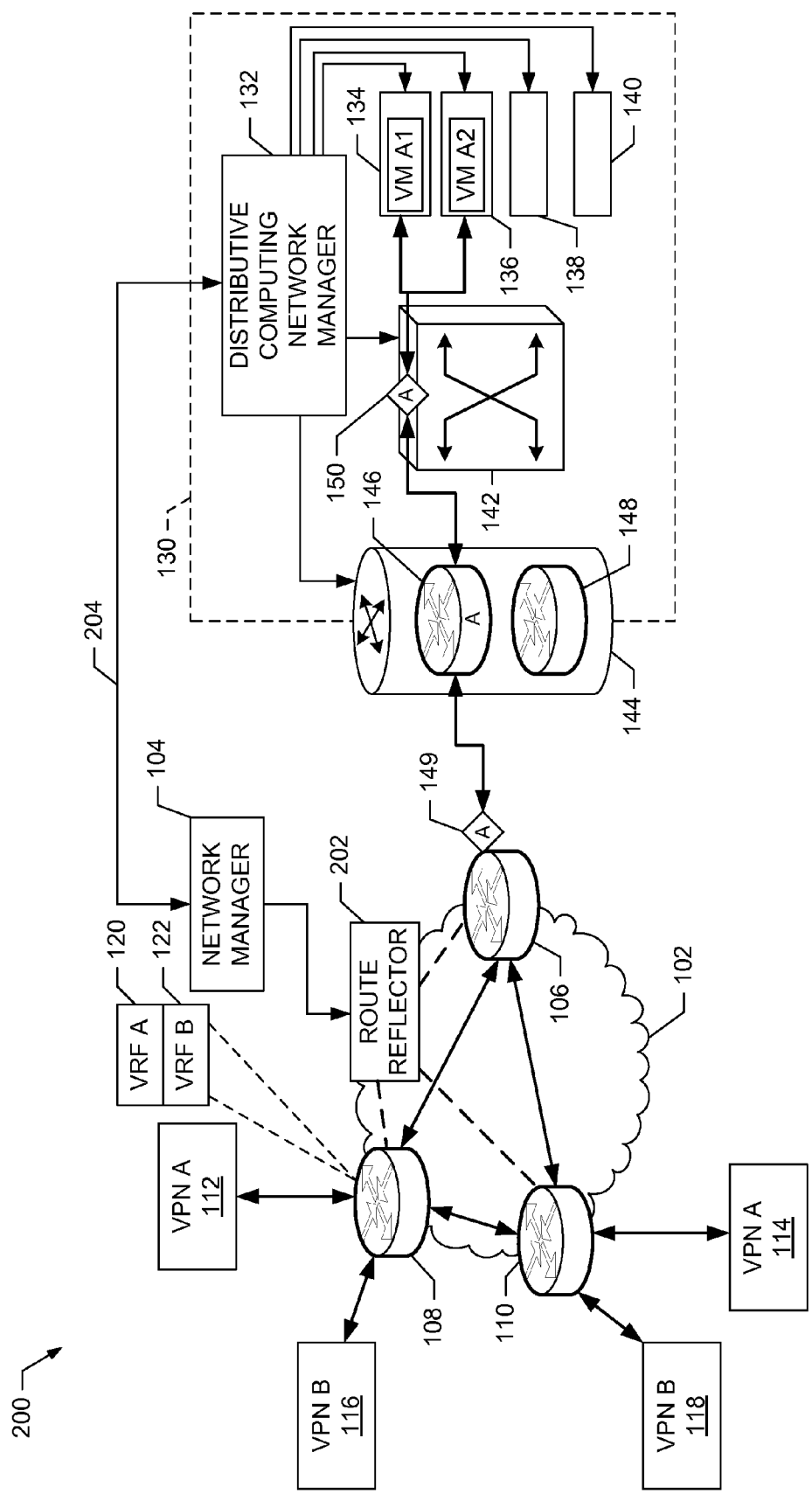
FIG. 2 shows a communication system including a route reflector implemented with a network manager.

FIG. 2 shows an example communication system 200 that includes a route reflector 202 implemented with the network manager 104. Additionally, unlike the network manager 104 in the communication system 100 of FIG. 1, the network manager 104 of FIG. 2 is communicatively coupled to the distributive computing network manager 132 via a communication path 204 to coordinate linking the router 144 to the router 106. For example, when the distributive computing network manager 132 creates the virtual machines VM A1 and VM A2 for the VPN A operated at the locations 112 and 114, the distributive computing network manager 132 communicates information regarding the virtual machines VM A1 and VM A2 to the network manager 104. This information may include the IP address of the virtual machines, the MAC address of the virtual machines, an identification associated with the logical router 146, and/or information associated with the VLAN path 150. Upon receiving the information, the network manager 104 may advertise the information to the routers 106-110 to configure a routing path to the logical router 146. The network manager 104 may also configure one or more VRF tables within the routers 106-110 to link the virtual machines VM A1 and VM A2 to the VPN A operated at the locations 112 and 114.

In FIG. 1, the distributive computing network manager 132 is shown as communicatively coupled to the network manager 104 via the routers 106 and 144. However, in FIG. 2, the distributive computing network manager 132 is communicatively coupled to the network manager 104 via the communication path 204 that may include any type of wired and/or wireless communication path. Additionally, in some examples, the network manager 104 and the distributive computing network manager 132 may be implemented by the same service provider. In these examples, the distributive computing network manager 132 and/or the network manager 104 may be included within the same entity and/or located at separate sites within the same service provider. Furthermore, the distributive computing network manager 132 may receive requests for virtual machines from the network manager 104 in cases where the network manager may manage any or all of the VPNs at the locations 112-118.

Further, FIG. 2 shows that the network manager 104 may be implemented outside of the switched network 102. In such a case, the network manager 104 may be communicatively coupled to the route reflector 202. While the example network manager 104 selects VRF tables within the routes 106-110 (e.g., configures the control plane of the routers 106-110), the example route reflector 202 rewrites route targets within the routers 106-110 to create routes from the VPN at the locations 112 and 114 to the virtual machines VM A1 and VM A2 (e.g., manages the routing of the routers 106-110). Further, the example route reflector 202 facilitates the sharing of routing information among the example routers 106-110. Because not all of the example routers 106-110 are necessarily communicatively coupled in a full mesh topology (for example, when at least one router 106-110 does not have a direct communication path to another router 106-110), the example route reflector 202 forwards BGP advertisements among and/or to the routers 106-110. By forwarding each received BGP advertisement, the example route reflector 202 enables each of the routers 106-110 to build, compile and/or construct a VRF table for each VPN that can be used by the routers 106-110 to route data from any CE router of a particular VPN to any other CE router of the VPNs at the locations 112-118.

The example route reflector 202 may control access from the VPNs operated at the locations 112-118 as described in U.S. patent application Ser. No. 12/262,615, which is hereby incorporated by reference in its entirety. To dynamically control access from neither, either or both of the example VPNs A and B to virtual machines VM A1 and VM A2, the example route reflector 202 forms a copy of a BGP advertisement that it receives (from the network manager 102 and/or the distributive computing network manager 132), modifies the copy of the received BGP advertisement, and sends and/or broadcasts the modified BGP advertisement. The example route reflector 202 also forwards the received BGP advertisement without modification.

Figure 3:
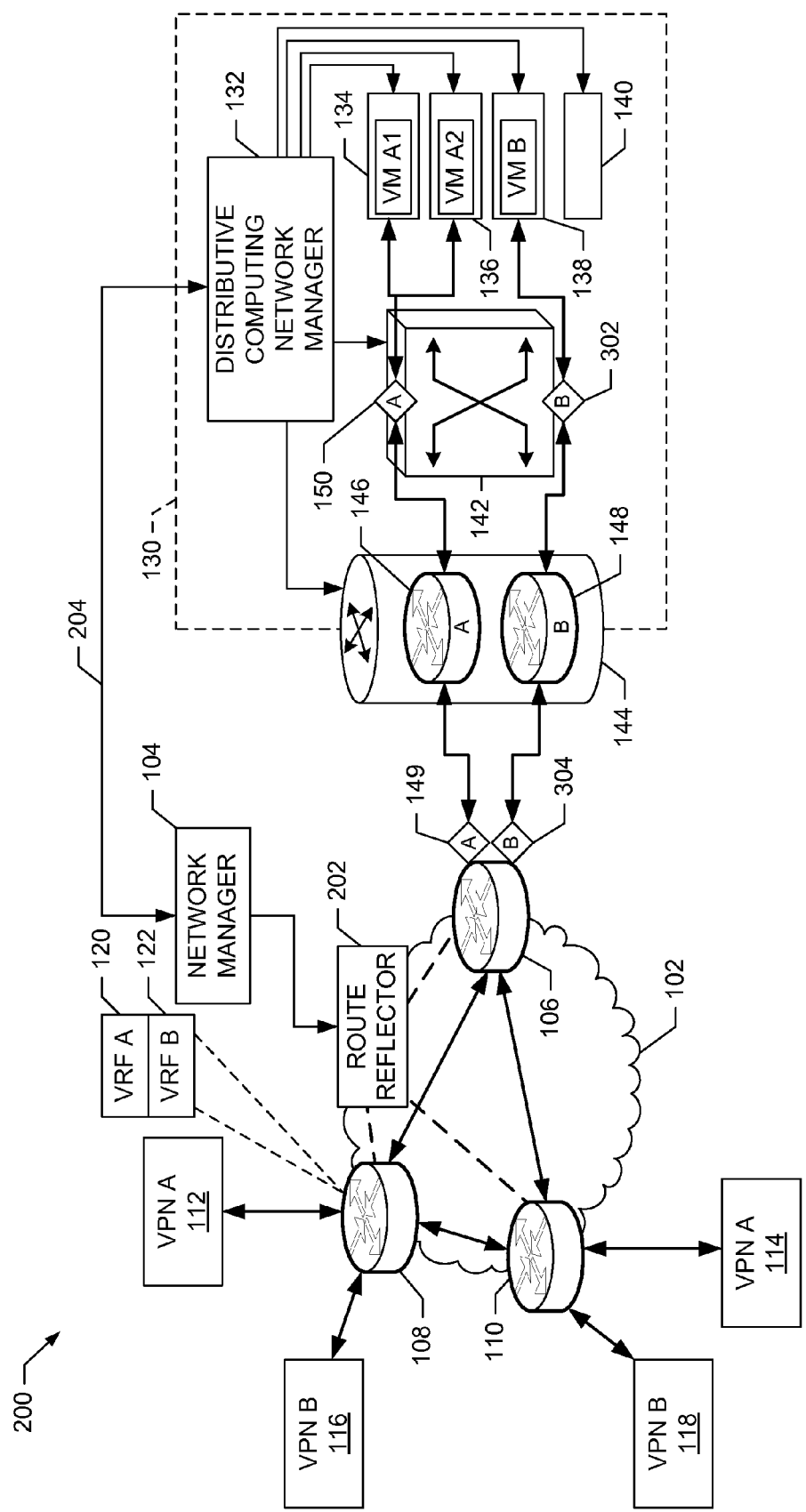
FIG. 3 shows the communication system of FIG. 2 with a VPN B communicatively coupled to a virtual machine B.

FIG. 3 shows the communication system 200 of FIG. 2 with VPN B at the locations 116 and 118 communicatively coupled to a virtual machine VM B within the server 138. In FIG. 3, the example distributive computing network manager 132 of FIGS. 1 and 2 receives a request for a virtual machine from the client B associated with the VPN B at the locations 116 and 118. The request may include identification parameters of the VPN B at the locations 116 and 118 that is to be communicatively coupled to the requested virtual machine. The request may also include any application information, operating system requirements, site location preferences, and/or any other information associated with virtual machine hosting. The client B may request the virtual machine via a service interface within the distributive computing network manager 132 and/or a service interface that is communicatively coupled to the distributive computing network manager 132.

Upon receiving the request, the distributive computing network manager 132 determines a host for the virtual machine by determining which of the servers 134-140 may have available processing space, memory, bandwidth, a compatible operating system, and/or any other hosting requirement specified in the request by the client B. In FIG. 3, the distributive computing network manager 132 determines that it is to host the virtual machine on the server 138 and creates the virtual machine VM B within the server 138. The distributive computing network manager 132 may create the virtual machine VM B by allocating memory, processing resources, applications, and/or any other requested resources to a portion of the server 138. Additionally, the distributive computing network manager 132 may assign an IP address and/or a MAC address to the virtual machine VM B.

In addition to creating the virtual machine VM B, the example distributive computing network manager 132 communicatively couples the virtual machine VM B to the VPN B at the locations 116 and 118 by partitioning an IP address space within the router 144 to create the logical router 148. The distributive computing network manager 132 may create a routing table corresponding to the IP address space allocated to the VPN B at the logical router 148. The IP address space may correspond to the IP address assigned to the virtual machine VM B. Additionally, the distributive computing network manager 132 may cross-reference the IP address space in a VRF table to a network interface allocated to the virtual machine VM B when the virtual machine VM B was created on the server 138. Further, the distributive computing network manager 132 may cross-reference the IP address space with a MAC address assigned to the network interface of the virtual machine VM B and/or a source IP address space associated with the VPN B at the locations 116 and 118.

The example distributive computing network manager 132 of FIG. 3 also creates a VLAN path 302 within the VLAN switch 142 from the virtual machine VM B within the server 138 to the logical router 148. Additionally, the distributive computing network manager 132 may cross-reference and/or assign the network interface of the virtual machine VM B to the VLAN path 302 and/or an identifier associated with the VLAN path 302. Furthermore, the distributive computing network manager 132 may cross-reference the VLAN path 302 in the VRF table within the logical router 148 to the IP address space assigned to the virtual machine VM B. Moreover, in examples where a virtual machine may be created on two or more hosts that may be located at different sites, the distributive computing network may implement an MPLS VPLS VPN (e.g., a layer 2 VPN) to communicatively couple the VLANs corresponding to each of the servers hosting the virtual machine.

By creating the VLAN path 302 from the logical router 148 to the virtual machine VM B, the example distributive computing network manager 132 creates a virtual machine VM B that is only accessible by computing resources associated with the locations 116 and 118 via the logical router 148. The VLAN path 302 isolates the virtual machine VM B from other virtual machines (e.g., the virtual machines VM A1 and VM A2). The logical router 148 ensures that communication packets with a destination address associated with the virtual machine VM B and a source address associated with the VPN B at the locations 116 and 118 are forwarded (e.g., allowed access) to the VLAN path 302. Furthermore, the logical router 148, the VLAN switch 142, the VLAN path 302, the server 138, and/or the virtual machine VM B may implement encryption and/or any other type of security for transmitting and/or forwarding communication packets.

When the example distributive computing network manager 132 of FIG. 3 establishes the VLAN path 302, the distributive computing network manager 132 advertises the routing to the virtual machine VM B to the routers 106-110 within the switching network 102, and/or to routers within the VPN B at the location(s) 116 and/or 118. The distributive computing network manager 132 may advertise the location of the virtual machine VM B by initiating an external BGP (EBGP) and/or a BGP session via the logical router 148, the router 144, and/or via the network manager 104 or the route reflector 202. Upon advertising the routing to the virtual machine VM B, the network manager 104 may create an interface 304 within the router 106 to forward communication packets from the routers 108 and 110 to the logical router 148 with a destination of the virtual machine VM B. Further, upon receiving the advertisement of the location of the virtual machine VM B, the client B may advertise the location of the virtual machine VM B within the VPN B at the locations 116 and 118. The client B may advertise the location of the virtual machine B by sending internal BGP messages within the VPN B at the locations 116 and 118 and/or by configuring applications and/or computing sources that will access the virtual machine VM B with the IP address of the virtual machine VM B.

Additionally or alternatively, the network manager 104 may pre-configure a set of VRF tables within the PE routers 106-110. Upon the example distributive computing network manager 132 of FIG. 3 establishing the VLAN path 302, the distributive computing network manager 132 may send an instruction to the network manager 104 that causes the network manager 104 to select at least one of the pre-configured VRF tables in the PE routers 106-110. The network manager 104 may then configure the route reflector 202 to rewrite route targets associated with the BGP VPN B routes within the PE routers 106-110. Rewriting the route targets communicatively couples the VPN B at the locations 116 and 118 to the selected VRF table (e.g., the VRF table B 122), which enables traffic to be securely routed to the virtual machine B via the interface 304.

After receiving the advertisement of the location of the virtual machine VM B, computing sources and/or applications associated with the locations 116 and 118 may access the virtual machine VM B. Additionally, the distributive computing network manager 132 may allow control to the client B to control the bandwidth, IP address assignment, MAC address assignment, network security, operating system, and/or application types utilized within and/or associated with the virtual machine VM B. Because the VLAN path 302, logical router 148, and/or partition within the server 138 for the virtual machine VM B is static, the client B may modify the virtual machine VM B without affecting other virtual machines within the distributive computing network 130. Further, because the VLAN path 302, logical router 148, and/or the IP address assigned to the virtual machine VM B is static, the client B may map applications and/or implement applications and/or data processors that target the virtual machine VM B without having to constantly re-map these applications.

To utilize the virtual machine VM B, one or more computing resources included within the VPN B at the locations 116 or 118 may transmit communication packets with a destination address corresponding to the virtual machine VM B. The communication packets may be associated with data transfer to an application on the virtual machine VM B, data transfer to a memory on the virtual machine VM B, and/or any other communication or data access of the virtual machine VM B. In this example, the communication packets are forwarded from a computing resource within the VPN B at the first location 116 to the router 108. Upon receiving the communication packets, the router 108 accesses a VRF table that references the interface 304 as a next hop. The router 108 then forwards the communication packets to the router 106, which then uses the interface 304 to forward the communication packets to the logical router 148. The logical router 148 receives the communication packets and determines that the destination address of the communication packets specify the virtual machine VM B. The logical router 148 then uses a VRF table to determine the appropriate VLAN path (e.g., the VLAN path 302) to forward the packets to the virtual machine VM B. Additionally, the logical router 148 may ensure that a source address of the communication packets corresponds to the VPN B 116 at the location(s) and/or 118. Upon forwarding the packets to the VLAN path 302, the VLAN path 302 delivers the communication packets to the virtual machine VM B via an associated network interface within the server 138. Similarly, virtual machine VM B may send communication packets to the computing source within the VPN B at the first location 116 by sending the packets to the logical router 148 via the VLAN path 302. The logical router 148 utilizes the routing targets within a VRF table to forward the packets to the interface 304 within the router 106, which then forwards the packets to the VPN 116 via the router 108.

The example distributive computing network manager 132 of FIG. 3 may also be used to change and/or modify virtual machines upon requests from clients. In these examples, the distributive computing network manager 132 may change the routing of VLAN paths, the partitioning of IP address space within the router 144, and/or the partitioning of hosting resources of the servers 134-140 as requested by the clients. Furthermore, the distributive computing network manager 132 may migrate the virtual machines and/or resources between servers as requested by the clients.

Figure 4:
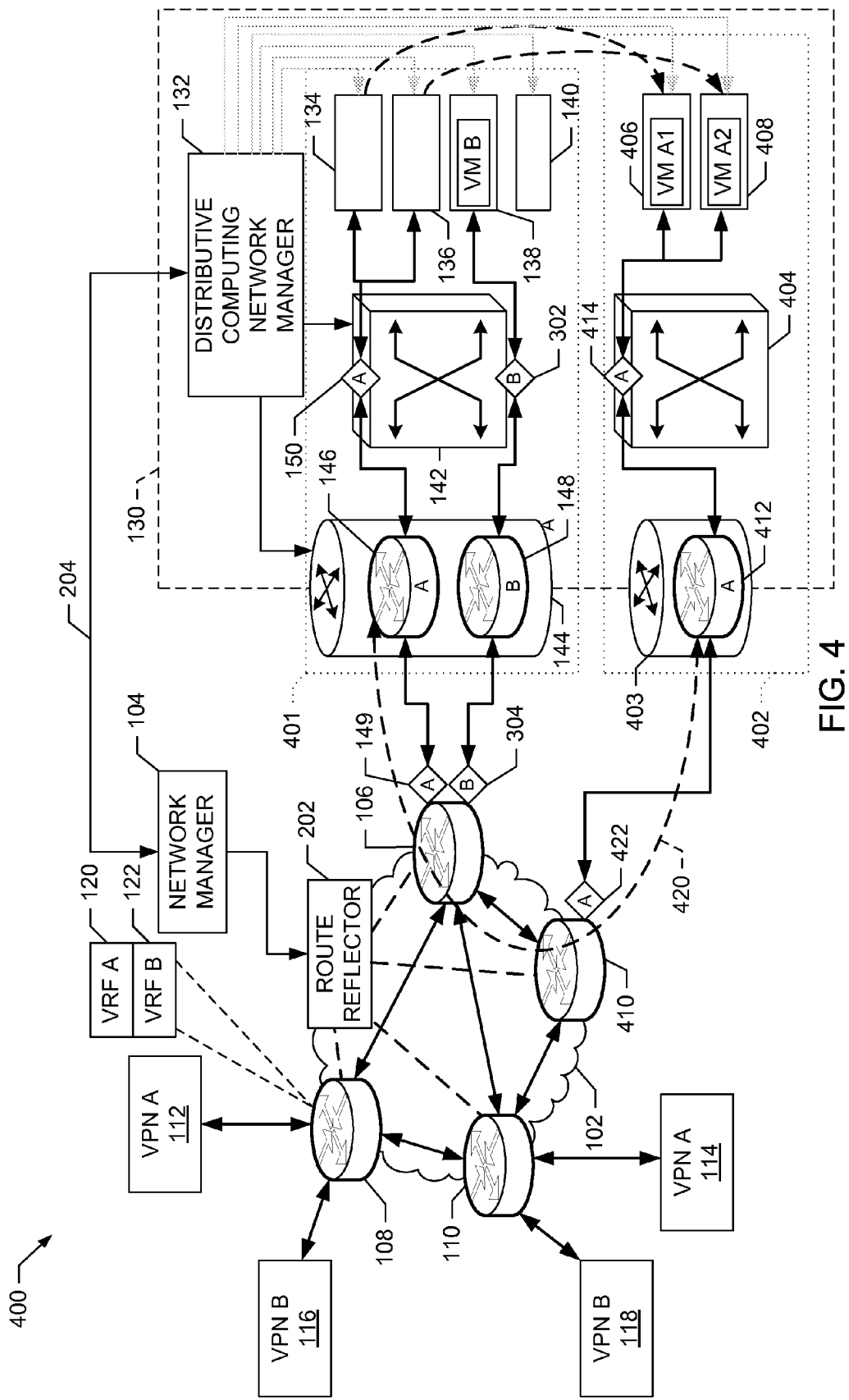
FIG. 4 shows the example communication system of FIG. 3 with virtual machines migrated to a different site.

FIG. 4 shows an example communication system 400 that includes first and second sites 401 and 402. The second site 402 includes a second router 403, a second VLAN switch 404 and servers 406 and 408. In this example, the router 144, the VLAN switch 142 and the servers 134-140 of FIGS. 1-3 are located at the first site 401 within the distributive computing network 130. The different sites 401 and 402 may be different data centers and/or different enterprise sites. The example distributive computing network manager 132 is communicatively coupled to and manages the servers 406 and 408, the second VLAN switch 404, and the second router 403. Further, the second router 403 is communicatively coupled to the switching network via a router 410. The router 410 is shown communicatively coupled to the routers 106 and 110 and the example route reflector 202. The router 410 may also be communicatively coupled to other routers within the switching network 102 and/or the VPN A at the locations 112 and 114 and/or the VPN B at the locations 116 and 118. The example router 410 may also include the VRF A 120 and the VRF B 122 (not shown).

The example in FIG. 4 shows a migration of the virtual machine VM A1 from the server 134 at the first site 401 to the server 406 at the second site 402 and a migration of the virtual machine VM A2 from the server 136 at the first site 401 to the server 408 at the second site 402. The virtual machines VM A1 and VM A2 may be moved to the second site 402 upon a request from the client A associated with the VPN A at the locations 112 and 114. For example, the client A may request to migrate the virtual machines VM A1 and VM A2 to improve transmission latency between the virtual machines VM A1 and VM A2 and the VPN A at the locations 112 and 114. Alternatively, the virtual machines VM A1 and VM A2 may be moved to the second site by the distributive computing network manager 132 to balance resource usage between the sites 401 and 402. In other examples, only one of the virtual machines VM A1 or VM A2 may be migrated to the second site 402 and/or a different site not shown. Alternatively, the distributive computing network manager 132 may modify the allocation of servers hosting the virtual machines VM A1 and VM A2 within the first site 401.

The example distributive computing network manager 132 manages the migration of the virtual machines VM A1 and VM A2 from the first site 401 to the second site 402 without affecting communication between the virtual machines VM A1 and VM A2 and the VPN A at the locations 112 and 114 (e.g., the migration is transparent to the client A). The example distributive computing network 132 manages the migration by initializing the second site 402 for the migration. The distributive computing network manager 132 initializes the second site 402 by determining and allocating servers to host the virtual machines VM A1 and VM A2 (e.g., the servers 406 and 408). The distributive computing network manager 132 may also partition IP address space associated with the virtual machines VM A1 and VM A2 within the second router 402 to create a logical router 412 and/or cross reference the IP address space in the logical router 412 to the source IP address space associated with the VPN A at the locations 112 and 114. Additionally or alternatively, the IP address space in the logical router 412 may be cross referenced to a route target associated with the VPN A routes. The example distributive computing network manager 132 further initializes second site 402 by creating a second VLAN path 414 within the second VLAN switch 404 from the servers 406 and 408 to the logical router 412.

Upon initializing the second site for the virtual machines VM A1 and VM A2, the example distributive computing network manager 132 of FIG. 4 creates a VPLS VPN 420 from the logical router 412 to the logical router 146 via the routers 410 and 106 within the switching network 102. The VPLS VPN 420 couples the VLAN 150 at the first site 401 with the second VLAN 414 at the second site 402. By linking together the VLANs 150 and 414, the example distributive computing network manager 132 creates a virtual network that is capable of routing traffic from the VPN A at the locations 112 and 114 to the virtual machines VM A1 and VM A2 regardless of the location of the virtual machines VM A1 and VM A2. Upon creating the VPLS VPN 420, the distributive computing network manager 132 creates a second VPLS VPN within the distributive computing network 130 to migrate the virtual machines VM A1 and VM A2 from the servers 134 and 136 at the first site 401 to the servers 406 and 408 at the second site 402.

Upon migrating the virtual machines VM A1 and VM A2 to the second site 402, the distributive computing network manager 132 may instruct the virtual machines VM A1 and A2 to transmit an address resolution protocol (ARP) message. In some examples, the virtual machines VM A1 and VM A2 may transmit the ARP message upon being migrated to the servers 406 and 408. In other examples, the virtual machines VM A1 and VM A2 may transmit a BGP advertisement message. The second VLAN switch 404 uses the ARP message to establish a mapping between the second VLAN path 414, a MAC address and/or IP address space assigned to the virtual machines VM A1 and VM A2, and/or an interface and/or a switch port allocated to the virtual machines VM A1 and VM A2 within the servers 406 and 408. The second logical router 412 may use the ARP message to create a cross-reference of the second VLAN path 414 to the IP address space and/or MAC address assigned to the virtual machines VM A1 and VM A2. The second logical router 412 may forward the ARP message to the switching network 102 so that the router 410 may create an interface 422 associated with the virtual machines VM A1 and VM A2. The ARP message may also update VRF tables in the other routers 106-110, the VPN A at the locations 112 and 114, and/or the logical router 146. Further, after migrating the virtual machines VM A1 and VM A2 to the second site 402, the distributive computing network manager 132 may disable the VLAN path 150 and reallocate the servers 134 and 136 to other virtual machines.

Figure 5:
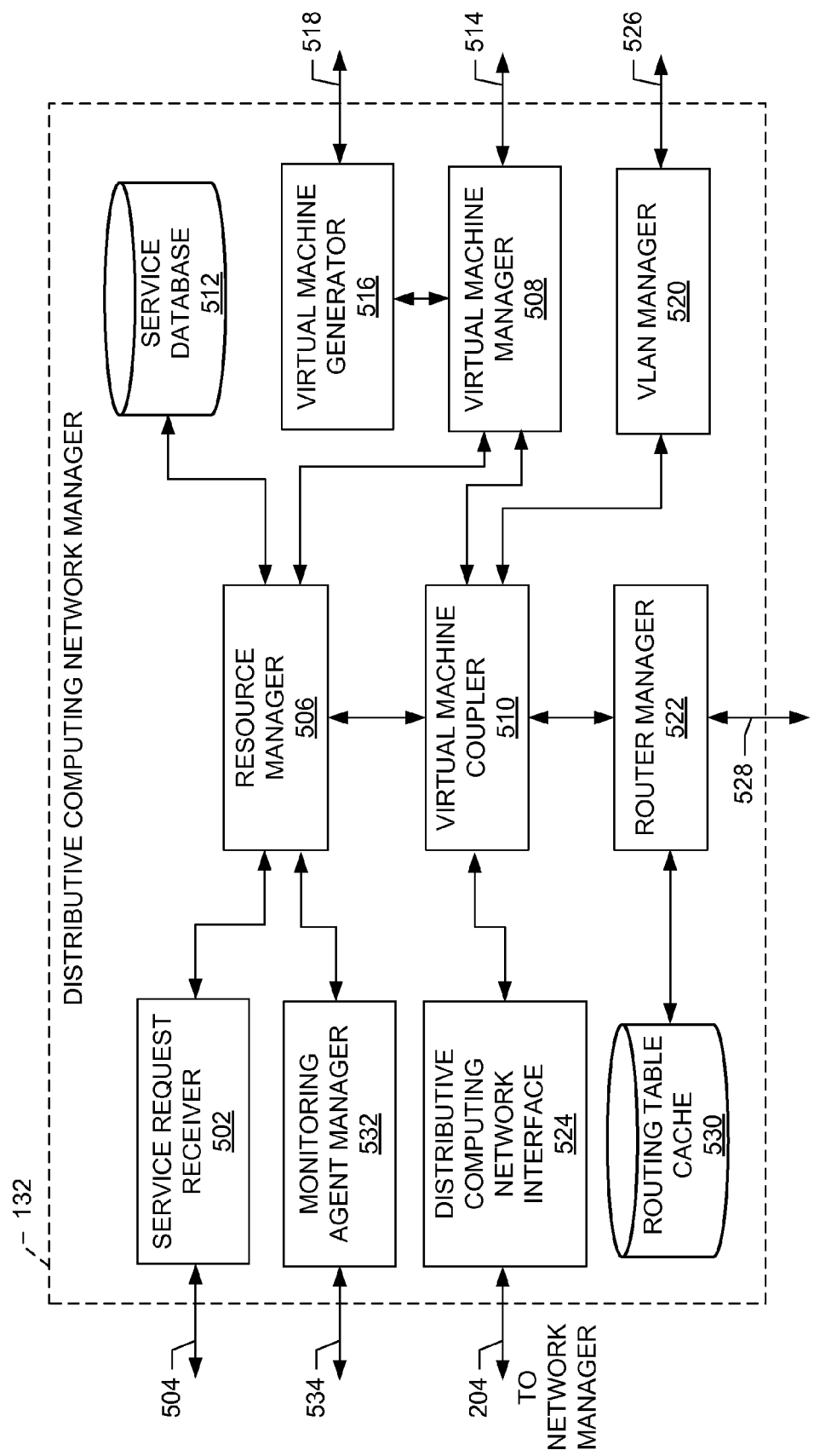
FIG. 5 illustrates an example manner of implementing a distributive computing network manager for any or all of the example communication systems of FIGS. 1-4.

FIG. 5 illustrates an example manner of implementing the distributive computing network manager 132 for one or both of the example communication system 100 and example communication system 200 of FIGS. 1-3. In addition to the functional blocks shown within the distributive computing network manager 132, the distributive computing network manager 132 may include functional blocks for a service interface to enable clients to specify and/or modify virtual machine parameters, administrative controls to manage the operation of the distributive computing network 130, and/or administrative interfaces to enable administrators to modify features, resources, and/or servers within the distributive computing network 130. Additionally, while the distributive computing network manager 132 is described as managing the distributive computing network 130, other distributive computing network managers may manage portions of the distributive computing network manager 132.

To receive requests for virtual machines, the example distributive computing network manager 132 of FIG. 5 includes a service request receiver 502. The example service request receiver 502 receives requests from clients regarding the creation and/or modification of virtual machines and/or parameters associated with virtual machines. The service request receiver 502 receives the requests via a communication path 504 that may be implemented by any type of wired and/or wireless communication path. The communication path 504 may communicatively couple the service request receiver 502 to a network manager (e.g., the network manager 104 of FIG. 1), a service interface, and/or any other functional entity that may transmit requests from clients.

A request from a client may include a request to create a virtual machine and may specify parameters including an identifier of a VPN associated with the client that will access the virtual machine, an amount of memory the client may require, an amount of processing capability the client may require, one or more host locations for the virtual machine, application types and/or images to be operated on the virtual machine, an operating system of the virtual machine, bandwidth access to the virtual machine, and/or security access to the virtual machine. Alternatively, a request may include a request to change or modify a parameter associated with the virtual machine and/or a request to deactivate the virtual machine.

The example service request receiver 502 may partition a request into data fields that may be read and/or accessed by other functional blocks within the distributive computing network manager 132. Further, the service request receiver 502 may determine a validity of a request and disregard requests determined to be invalid. The service request receiver 502 may also queue requests from clients until the requests can be processed by the other functional blocks within the distributive computing network manager 132.

To manage the allocation of resources within the distributive computing network manager 132, the distributive computing network manager 132 includes a resource manager 506. The example resource manager 506 receives and processes requests from clients by performing an action specified by the requests. For example, upon receiving a request to create a virtual machine, the resource manager 506 may determine a host for the virtual machine and coordinate the coupling of the virtual machine to a VPN of the requesting client. Further, upon the resource manager 506 determining a host, the resource manager 506 may assign an IP address and/or a MAC address to the virtual machine. The resource manager 506 may also send instructions to a virtual machine manager 508 to create the virtual machine and specify which server(s) to host the virtual machine. Additionally, the resource manager 506 may send instructions to a virtual machine coupler 510 to initiate the coupling of the virtual machine to the VPN of the client. The instructions may include an identifier of the VPN of the client and/or an address or a server location assigned to the virtual machine.

The example resource manager 506 of FIG. 5 may store request information and virtual machine parameter information to a service database 512. The resource manager 506 may access the service database 512 to determine which server(s) are to host the virtual machine by determining the current allocation of resources and/or virtual machines on available servers (e.g., the servers 134-140). The resource manager 506 may determine a host based on optimization routines that may include hosting virtual machines by servers with a common operating system, by servers with sufficient memory or processing availability, by servers hosting certain types of applications, and/or by server location to minimize transmission time to a VPN. Upon determining a host for a virtual machine, the resource manager 506 may store virtual machine parameters, host information associated with the virtual machine, and/or client request information to the service database 512. The service database 512 may be implemented by Electronically Erasable Programmable Read-Only Memory (EEPROM), Random Access Memory (RAM), Read-Only Memory (ROM), and/or any other type of memory.

The example resource manager 506 of FIG. 5 may manage the allocation of resources within the distributive computing network 130 via a monitoring agent manager 532. The resource manager 506 may determine that resources should be reallocated and/or migrated to different hosts based on performance metrics provided by the monitoring agent manager 532. If the resource manager 506 determines that one or more virtual machines should be migrated to a different host, the resource manager 506 assesses the service database 512 to determine available resources. The resources may be located at a different site and/or within different servers. Upon determining an appropriate host, the resource manager 506 changes the allocation of the virtual machines to the new host and stores the information within the service database 512. The resource manager 506 may then send instructions to initialize the new host for the migration.

To manage virtual machines on hosts, the example distributive computing network manager 132 of FIG. 5 includes the virtual machine manager 508. The example virtual machine manager 508 receives instructions from the resource manager 506 to create virtual machines including the server(s) that are to host the virtual machines. The virtual machine manager 508 may also modify the allocation of virtual machines and/or virtual machine resources based on requests from clients, capacity of the servers, and/or processing usage of the servers. The virtual machine manager 508 may be communicatively coupled to the servers within the distributive computing network 130 via a communication path 514. The example communication path 514 may include any type of wired and/or wireless communication path. The virtual machine manager 508 may determine server usage information and/or instruct the servers to modify virtual machines via the communication path 514.

The example virtual machine manager 508 may create a virtual machine by sending an instruction to a virtual machine generator 516 including specifying the server(s) to host the virtual machine. The instructions may also specify the applications and/or application images to be included within the virtual machine, the memory size to be allocated for the virtual machine, and/or an amount of processing to be allocated for the virtual machine. In cases where more than one server is to host a virtual machine, the virtual machine manager 508 may send an instruction to the virtual machine generator 508 for each server to host the virtual machine. In other examples, the virtual machine manager 508 may send a single instruction and the virtual machine generator 516 may create a virtual machine on the specified server(s). Additionally, the virtual machine manager 508 may communicate with the server(s) to ensure the virtual machine was created by the virtual machine generator 516.

To create and/or configure virtual machines, the example distributive computing network manager 132 includes the virtual machine generator 516. The example virtual machine generator 516 communicates with servers via a communication path 518 to instruct server(s) to host virtual machines. The communication path 518 may include any type of wired and/or wireless communication path.

The example virtual machine generator 516 of FIG. 5 receives instructions to create a virtual machine from the virtual machine manager 508. Upon receiving the instructions, the virtual machine generator 516 accesses the server(s) to host the virtual machine and configures the server(s) to partition processing and/or memory resources to host the virtual machine. The virtual machine generator 516 may then install the one or more applications, application images, operating systems, and/or any other virtual machine features within the server(s). The virtual machine generator 516 may also set the IP and/or MAC address of the virtual machine with the server(s). Further, the virtual machine generator 516 may configure a network interface on the server(s) to be communicatively coupled to the virtual machine operating with the server(s). The virtual machine generator 516 may create the virtual machine by accessing an application database of available applications and/or operating systems and installing the corresponding components to the server(s). In examples where a client requests a virtual machine to operate a custom application, the virtual machine generator 516 may receive the application via the service request receiver 502. Further, in examples where the resource manager 506 sends an instruction to migrate a virtual machine to a new host, the virtual machine manager 508, upon initializing resources to host the virtual machine, migrates the virtual machine from the old host to the new host.

Upon creating a virtual machine on a server, the virtual machine generator 516 may send a message indicating the creation of the virtual machine and/or the network interface assigned to the virtual machine to the virtual machine coupler 510. Additionally, in examples where a client modifies virtual machine parameters, the virtual machine generator 516 may receive the request to modify the parameters and modify the virtual machine on the server(s) according to the modified parameters. For example, if a client wants to add a new application to be hosted by a virtual machine, the client may send an instruction via the service request receiver 502 to add the application. Upon receiving the request, the virtual machine generator 516 may install the requested application on the server(s) hosting the virtual machine via the communication path 518.

To couple a virtual machine on a server to a CE router (e.g., the router 144 of FIG. 3) within the distributive computing network 130, the example distributive computing network manager 132 includes the virtual machine coupler 510. The example virtual machine coupler 510 communicatively couples the virtual machine to a VLAN within the distributive computing network 130. Upon receiving an instruction to initiate the coupling of the virtual machine to the VPN of the client, the virtual machine coupler 510 waits until a message indicating the creation of the virtual machine on the server(s) is received from the virtual machine manager 508. Upon receiving the message, the virtual machine coupler 510 send an instruction to a VLAN manager 520 to create a VLAN path from the server to a router. Additionally, the virtual machine coupler 510 may send an instruction to a router manager 522 to partition address space in a router and to update VRF tables associated with the router. In some examples, the virtual machine coupler 510 may send instructions to the VLAN manager 520 and/or the router manager 522 upon receiving an instruction to couple a virtual machine to a VPN of a client. Further, the virtual machine coupler 510 may assign an identification value associated with a VLAN path to be created to communicatively couple the virtual machine to the router. The virtual machine coupler 510 may then forward the VLAN identification value and the network interface identifier to the router manager 522 to be stored in a VRF table associated with the virtual machine.

The example virtual machine coupler 510 may also receive messages indicating a virtual machine is communicatively coupled to a logical router. Upon receiving these messages, the virtual machine coupler 510 may initiate BGP advertising of the virtual machine by sending an instruction to a distributive computing network interface 524. Additionally, in examples where a virtual machine is moved to a different server, the virtual machine coupler 510 may manage the re-routing of a VLAN path between the different server to host the virtual machine and a logical router.

To create a VLAN path (e.g., the VLAN paths 150 and 302 of FIG. 3), the example distributive computing network manager 132 of FIG. 5 includes the VLAN manager 520. The VLAN manager 520 may create VLAN paths, VPLS paths, and/or LAN paths based on a request from a client and/or a request from site locations to host a virtual machine. The example VLAN manager 520 manages VLAN paths within the VLAN switch 142 of FIG. 1. The example VLAN manager 520 communicates within the VLAN switch 142 via a communication path 526 that may include any type of wired and/or wireless communication path. In some examples, the VLAN manager 520 may be part of a VLAN controller. By setting up VLAN paths for each VPN, the VLAN manager 520 ensures that only computing resources associated with a VPN communicatively coupled to a VLAN path are capable of communicating with a virtual machine communicatively coupled to the same VLAN path.

Upon receiving an instruction from the virtual machine coupler 510 to create a VLAN path from a virtual machine to a router, the example VLAN manager 520 configures a physical and/or a logical path within the VLAN switch 142. The VLAN manager 520 may configure a VLAN path by determining the server(s) and corresponding network interface(s) associated with a virtual machine and determining which portions of the VLAN switch 142 are coupled to the server(s). The VLAN manager 520 may then specify an unused VLAN connection from the VLAN switch 142 to the server to be communicatively coupled to the virtual machine via the corresponding network interface within the server. If there is more than one sever that is to be communicatively coupled to a VPN, the VLAN manager 520 may couple VLAN paths from the servers together within the VLAN switch 142 using a VPLS. The VLAN manager 520 may then route the VLAN path to a physical router (e.g., the router 144 of FIG. 3) and/or a logical router (e.g., the logical router 148).

The example VLAN manager 520 may route a VLAN path from the VLAN switch 142 to a router by determining one or more unused connections from the VLAN switch 142 to the physical router and/or the logical router. The example VLAN manager 520 may then complete the VLAN path by specifying that the VLAN switch 142 is to communicatively couple the connection(s) from the physical router to the connection(s) of the network interface(s) within the sever(s) hosting the virtual machine. The coupling may be carried out logically by specifying a communication path in a multiplexing type of VLAN switch and/or the coupling may be carried out physically by relays and/or switches that may be actuated to appropriate positions to complete the VLAN path.

The example VLAN manager 520 may assign an identifier to a VLAN path upon creating the VLAN path within the VLAN switch 142. The VLAN manager 520 may then forward the VLAN path identifier to the router manager 522 to include the VLAN path identifier within a VRF table. The example VLAN manager 520 may also allocate bandwidth for a VLAN path within the VLAN switch 142 based on request parameters specified by a client. For example, the VLAN manager 520 may create a VLAN path using a plurality of connections between a network interface to a virtual machine and a router for a client that requests a significant amount of bandwidth for a virtual machine. In other examples, the VLAN manager 520 may modify the bandwidth of a VLAN path upon a request from a client.

Further, if a client requests that a virtual machine is to appear as a part of a VPN and/or a LAN of the client, the VLAN manager 520 may extend the VLAN path from the VLAN switch 142 within the distributive computing network 130 to a VPN of the client (e.g., the VPN A at the locations 112 and 114). The VLAN manager 520 may extend the VLAN path to a VPN of a client by creating a VPLS for the client and linking the VLAN path within the VLAN switch 142 to the VPLS, which may then be linked to an interface within a VPN of the client. In examples where a virtual machine may be implemented within servers included within multiple distributive computing networks, the VLAN manager 520 may link VLAN paths within each distributive computing network to a VPLS that may then be linked to an interface within the VPN of the client such that the interface forwards communication packets directly to the VPLS. The VPLS may then forward the communication packets to one of the available VLANs based on availability of the virtual machine at each of the servers within the distributive computing networks. The interface may be located within a CE router within the VPN of the client and may be specified by the client and/or a network manager (e.g., the network manager 104).

To manage the allocation of logical routers, the example distributive computing network manager 132 includes the example router manager 522. The example router manager 522 is communicatively coupled to a router (e.g., the router 144) via a communication path 528 that may include any type of wired and/or wireless communication path. The example router manager 522 determines routing allocations for IP address spaces (or subspaces) corresponding to virtual machines hosted by servers within the distributive computing network 132. The router manager 522 manages the routing allocations using VRF tables that may be stored in a routing table cache 530.

The example router manager 522 of FIG. 5 receives instructions to allocate IP address space for a virtual machine from the virtual machine coupler 510. The instructions may include IP address(es) assigned to a virtual machine, MAC address(es) assigned to a virtual machine, network interface(s) assigned to a virtual machine, and/or an identifier of a VLAN path coupled to a virtual machine. The instructions may further include an identifier of a client VPN that is to be coupled to a virtual machine.

Upon receiving an instruction to allocate IP address space, the router manager 522 determines the routing allocations of CE routers (e.g., the router 144) on the edge of the distributive computing network 130 that receives communication packets from computing sources external to the distributive computing network 130. The router manager 522 may select a router with available processing space and partition a portion of the router into a logical router (e.g., the logical router 148). The router manager 522 may partition the logical router by defining an address subspace associated with the virtual machine and/or an address space associated with a VPN of a client. The router manager 522 may also configure an interface of the logical router to couple to a VLAN path created by the VLAN manager 520. Thus, any communication packets with a destination address associated with the virtual machine and/or a source address associated with the VPN of the client may be routed directly to the logical router from a router within the switching network 102 of FIG. 3. The logical router may then access a VRF and/or routing table to determine a VLAN path to forward the communication packets to the virtual machine.

The logical router functions as a security access point by only routing communication packets from computing sources associated with a VPN of a client to the corresponding virtual machine. Further, because the IP address and/or the MAC address of a virtual machine is static, the logical router does not need to update VRF tables constantly to reflect address changes. Because the address of the virtual machine is constant, computing sources within a VPN of a client may utilize the address of the virtual machine in applications that use the virtual machine address as a target for accessing data and/or other applications without having to constantly update the address mapping to the virtual machine. Further, because the address mapping does not change, clients may also access the virtual machines by specifying interfaces within the VPN to forward communication packets directly to the logical routers and/or the virtual machines.

Upon partitioning space for a logical router, the example router manager 522 may store routing information associated with the virtual machine and the VPN of the client to the routing table cache 530. The routing table cache 530 may be implemented by EEPROM, RAM, ROM, and/or any other type of memory. The router manager 522 may store the routing information and/or a VRF table within the routing table cache 530 so that the logical router may access the VRF table for routing communication packets. The example router manager 522 may also cross-reference routing information within the VRF table. For example, the router manager 522 may cross-reference an IP address and/or a MAC address assigned to a virtual machine to a VLAN path identifier that couples the virtual machine to the logical router.

The router manager 522 may also cross-reference an IP address of a virtual machine to an IP address space associated with a VPN of a client and/or to an interface associated with the VPN. Further, the router manager 522 may cross-reference an address space of a client VPN to an identifier of a VLAN path communicatively coupled to an associated virtual machine. Upon creating a logical router and storing routing information to a VRF table, the router manager 522 may send a message to the virtual machine coupler 510 indicating access to the virtual machine via the router is complete and that the router is capable of routing communication packets originating from the VPN of the client to the virtual machine.

To manage the setup of a communication path from a CE router within the distributive computing network 130 to a switching network (e.g., the network 102), the example distributive computing network manager 132 includes the distributive computing network interface 524. The example distributive computing network interface 524 is communicatively coupled to the network manager 104 via the communication path 204 of FIGS. 2 and 3. In other examples, the distributive computing network interface 524 may communicate to a network manager and/or routers within a switching network through a CE router within the distributive computing network 130. Further, in examples where a virtual machine is migrated to a different site, the distributive computing network interface 524 may coordinate with the router manager 522 to create a VPLS VPN between the two sites. Additionally, the distributive computing network manager 524 may instruct the network manager 104 to pre-configure one or more PE routers (e.g., the routers 106-110) with a set of VRF tables.

The example distributive computing network interface 524 of FIG. 5 initiates an advertisement for the routing to a virtual machine by starting a BGP session and/or a EBGP session between a router (e.g., the logical router 148 and/or the router 144) within the distributive computing network 130 and a router including an interface for a VPN of a client (e.g., the router 106). Additionally or alternatively, the distributive computing network interface 524 may advertise the location and/or routing to a virtual machine by sending an ARP message and/or by instructing the virtual machine to send an ARP message. The distributive computing network interface 524 may start a BGP session by sending an instruction to the CE router (e.g., the router 144) and/or the logical router (e.g., the logical router 148) to start sending messages including the routing to a virtual machine to be advertised. Upon receiving the message, the CE router may then advertise the route and/or information associated with the virtual machine to other routers and/or computing sources associated with the VPN of the client. Upon receiving an advertisement including routing information to the virtual machine, the routers associated with the VPN of the client may update VRF tables to reflect routes, route targets, and/or interfaces to the virtual machine.

The distributive computing network interface 524 may also communicate the routing information associated with a virtual machine to the network manager 104. The network manager 104 may then communicate the routing information for the virtual machine to the routers associated with the VPN of the client within the switching network 102. Additionally, the network manager 104 may set an interface within a router to communicatively couple the switching network 102 to a logical router associated with the virtual machine. In this manner, the network manager 104 may create a communication path between the distributive computing network 130 and the switching network 102 for a virtual machine.

Additionally, or alternatively, upon receiving the routing information from the distributive computing network interface 524 via an instruction and/or message, the network manager 104 may select at least one of the pre-configured VRF tables within the PE router(s) to couple the logical router to the VPN of the client. The network manager 104 may then configure a route reflector, a route server, and/or a route controller to rewrite route targets associated with the VPN routes advertised from the PE routers using BGP. Rewriting the route targets dynamically communicatively couples the VPN of the client to the selected VRF table enabling secure communication with the virtual machine within the distributive computing network.

To manage a consistent view of the distributive computing network 130 to clients, the example distributive computing network manager 132 includes the monitoring agent manager 532. The example monitoring agent manager 532 receives status updates from a set of monitoring agents distributed across site locations of the distributive computing network 132. The monitoring agents may monitor the performance of servers and/or virtual machines within servers and relay performance metrics back to the monitoring agent manager 532 via a communication path 534. The example monitoring agent monitor 532 may use the performance information to ensure servers and/or virtual machines are operating according to client and/or distributive computing network manager 132 requirements. If a server and/or a virtual machine is not operating in a way that meets the requirements, the monitoring agent manager 532 may attempt to remediate the issue before sending an instruction to the resource manager 506 to request a client to remediate the issue by reallocating virtual machine resources to correct the issue.

While an example manner of implementing the distributive computing network manager 132 is depicted in FIG. 5, one or more of the interfaces, data structures, elements, processes and/or devices illustrated in FIG. 5 may be combined, divided, rearranged, omitted, eliminated and/or implemented in any other way. For example, the example service request receiver 502, the example resource manager 506, the example virtual machine manager 508, the example virtual machine coupler 510, the example virtual machine generator 516, the example VLAN manager 520, the example router manager 522, the example distributive computing network interface 524, and/or the example monitoring agent manager 532 illustrated in FIG. 5 may be implemented separately and/or in any combination using, for example, machine-accessible or readable instructions executed by one or more computing devices and/or computing platforms (e.g., the example processing platform P100 of FIG. 8).

Further, the example service request receiver 502, the example resource manager 506, the example virtual machine manager 508, the example virtual machine coupler 510, the example virtual machine generator 516, the example VLAN manager 520, the example router manager 522, the example distributive computing network interface 524, the example monitoring agent manager 532 and/or, more generally, the distributive computing network manager 132 may be implemented by hardware, software, firmware and/or any combination of hardware, software and/or firmware. Thus, for example, any of the example service request receiver 502, the example resource manager 506, the example virtual machine manager 508, the example virtual machine coupler 510, the example virtual machine generator 516, the example VLAN manager 520, the example router manager 522, the example distributive computing network interface 524, the example monitoring agent manager 532 and/or, more generally, the distributive computing network manager 132 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software implementation, at least one of the example service request receiver 502, the example resource manager 506, the example virtual machine manager 508, the example virtual machine coupler 510, the example virtual machine generator 516, the example VLAN manager 520, the example router manager 522, the example distributive computing network interface 524, and/or the example monitoring agent manager 532 are hereby expressly defined to include a tangible medium such as a memory, DVD, CD, etc. Further still, the example distributive computing network manager 132 of FIG. 5 may include one or more elements, processes and/or devices in addition to, or instead of, those illustrated in FIG. 5, and/or may include more than one of any or all of the illustrated elements, processes and devices.

Figure 6A:
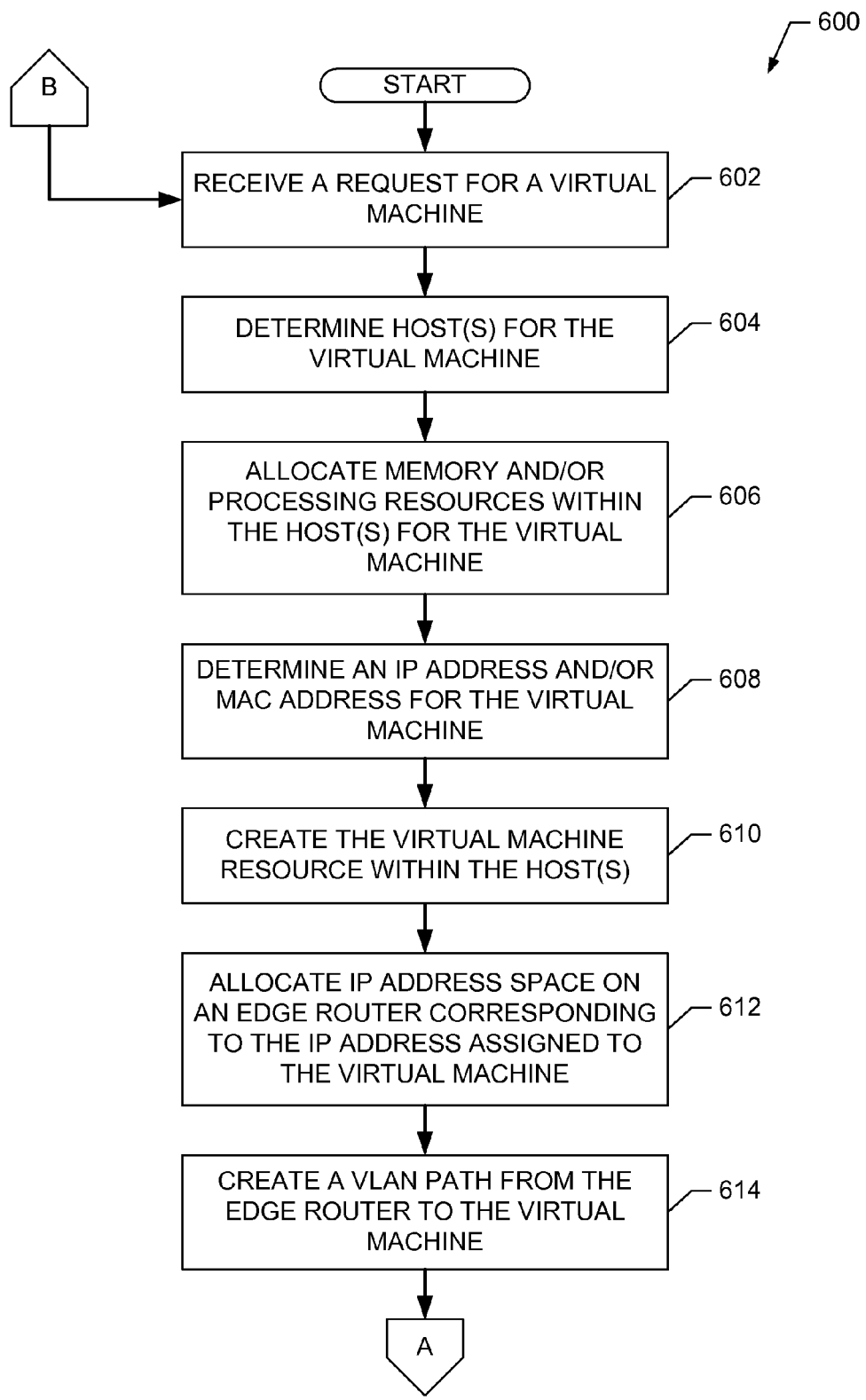
FIGS. 6A, 6B, and 7 are flowcharts representative of example processes, which may be implemented using, for example, machine-accessible instructions, that may be carried out to implement the example distributive computing network manager of FIGS. 1, 2, 3, 4, and/or 5.
Figure 6B:
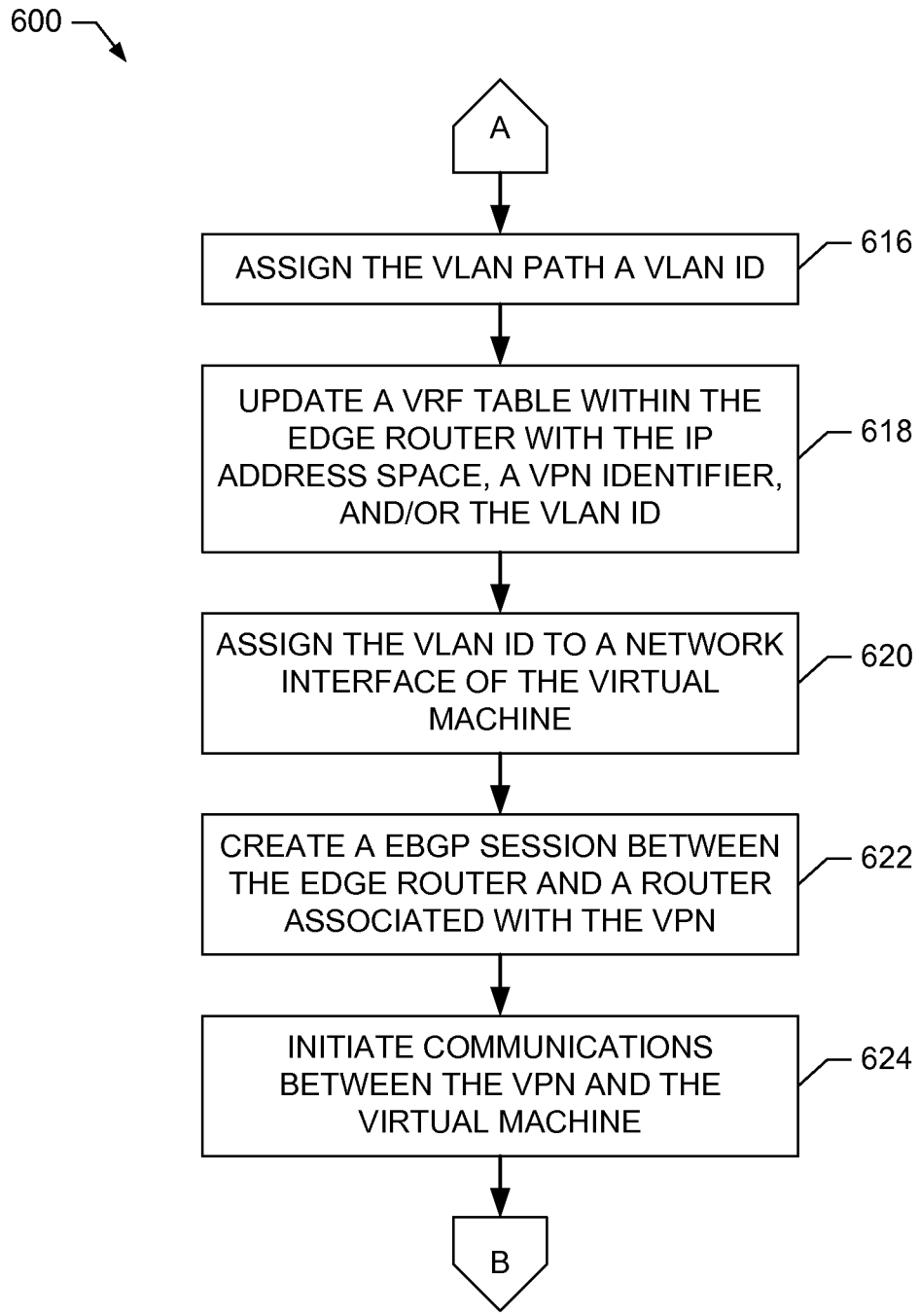
Figure 7:
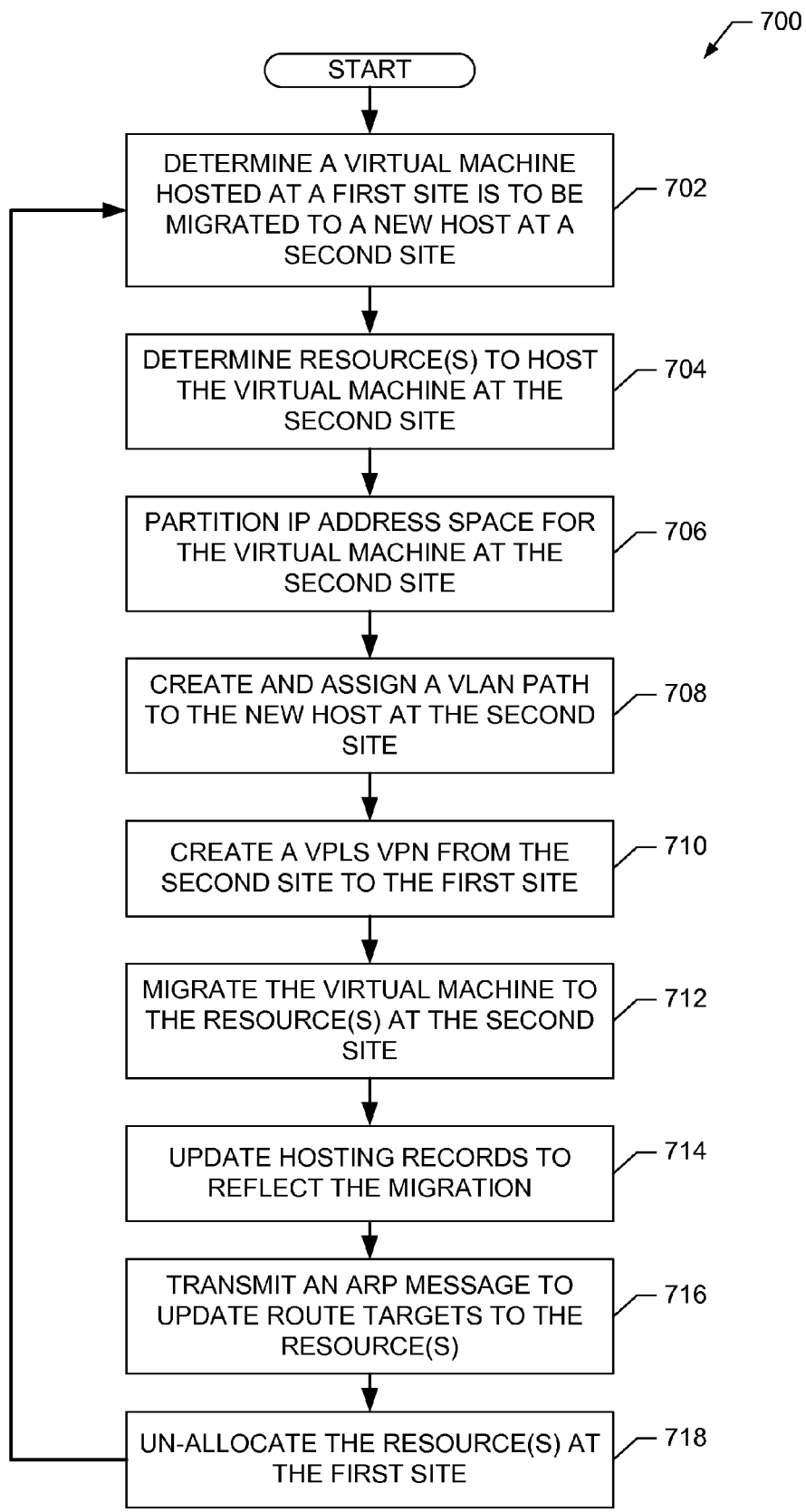

FIGS. 6A, 6B, and 7 are flowcharts of example processes, which may be implemented using machine-accessible instructions, that may be carried out to implement the example service request receiver 502, the example resource manager 506, the example virtual machine manager 508, the example virtual machine coupler 510, the example virtual machine generator 516, the example VLAN manager 520, the example router manager 522, the example distributive computing network interface 524, the example monitoring agent manager 532 and/or, more generally, the distributive computing network manager 132 of FIGS. 1 and/or 5. The example processes of FIGS. 6A, 6B, and/or 7 may be carried out by a processor, a controller and/or any other suitable processing device. For example, the example processes of FIGS. 6A, 6B, and/or 7 may be embodied in coded instructions stored on any tangible computer-readable medium such as a flash memory, a CD, a DVD, a floppy disk, a ROM, a RAM, a programmable ROM (PROM), an electronically-programmable ROM EPROM, EEPROM, an optical storage disk, an optical storage device, magnetic storage disk, a magnetic storage device, and/or any other tangible or non-tangible medium that can be used to carry or store program code and/or instructions in the form of methods or data structures, and which can be accessed by a processor, a general-purpose or special-purpose computer, or other machine with a processor (e.g., the example processor platform P100 discussed below in connection with FIG. 8). Combinations of the above are also included within the scope of computer-readable media. Alternatively, some or all of the example processes of FIGS. 6A, 6B, and/or 7 may be implemented using any combination(s) of ASIC(s), PLD(s), FPLD(s), discrete logic, hardware, firmware, etc.

Also, some or all of the example processes of FIGS. 6A, 6B, and/or 7 may instead be implemented using manual operations or as any combination of any of the foregoing techniques, for example, any combination of firmware, software, discrete logic and/or hardware. Furthermore, many other methods of implementing the example processes of FIGS. FIGS. 6A, 6B, and/or 7 may be employed. For example, the order of execution of the blocks may be changed, and/or one or more of the blocks described may be changed, eliminated, sub-divided, or combined. Additionally, any or all of the example processes of FIGS. FIGS. 6A, 6B, and/or 7 may be carried out sequentially and/or carried out in parallel by, for example, separate processing threads, processors, devices, discrete logic, circuits, etc.

The example process 600 of FIG. 6A communicatively couples a VPN to a virtual machine within a distributive computing network. Multiple example processes 600 may be executed in parallel or series to communicatively couple multiple VPNs to virtual machines within the distributive computing network. Further, in cases where a virtual machine may be created on more than one server, multiple example processes 600 may be executed in parallel or series to communicatively couple the virtual machines to a VPN of a client.

The example process 600 of FIG. 6A begins when the service request receiver 504 receives a request for a virtual machine (block 602). The request may originate from a client desiring to communicatively couple a VPN to a virtual machine. Next, the example process 600 (e.g., the resource manager 506) determines one or more hosts for the virtual machine (block 604). The process 600 (e.g., the resource manager 506) may select a host by determining the available processing and/or memory of each server that is capable of hosting a virtual machine. Depending on the requirements of the virtual machine and the available resources of servers, the process 600 may select one or more servers to host the virtual machine. Upon selecting the host(s), the process 600 (e.g., the resource manager 506) allocates memory and/or processing resources within the host(s) for the virtual machine (block 606). The example process 600 may allocate resources on a host for a virtual machine by partitioning a portion of a memory or a processor of a server.

The example process 600 of FIG. 6A continues when the process 600 (e.g., the resource manager 506) determines an IP address and/or a MAC address for the virtual machine (block 608). The example process 600 may also determine a network interface on the server(s) to logically connect the virtual machine to a physical network. Next, the process 600 (e.g., the virtual machine manager 508 and/or the virtual machine generator 516) create the virtual machine within the server(s) that were determined to host the virtual machine (block 610). The process 600 (e.g., the virtual machine coupler 522) may then couple the virtual machine to the network interface and assign the IP address and/or the MAC address to the virtual machine.

The process 600 (e.g., the router manager 522) next allocates IP address space on an edge router, where the IP address space corresponds to the IP address assigned to the virtual machine (block 612). The process 600 may allocate IP address space on an edge router by creating a logical router within the edge router and/or creating a VRF table that cross-references the IP address assigned to the virtual machine to the VPN of the client. The edge router may be located within the same distributive computing network as the virtual machine. In other examples, the edge router may be located in a switching network communicatively coupled to the distributive computing network. The example process 600 (e.g., the VLAN manager 520) then creates a VLAN path from the edge router to the virtual machine (block 614). Additionally, in cases where more than one server hosts the virtual machine, the process 600 may create a VPLS to couple VLANs that connect to respective servers hosting the virtual machine.

The example process 600 of FIG. 6B continues when the virtual machine coupler 510 assigns an identification value (e.g., a VLAN ID) to the VLAN path (block 616). Next, the process 600 (e.g., the router manager 522) updates a VRF table within the edge router by cross-referencing the IP address of the virtual machine, the IP address space assigned to the logical router, the VLAN identifier, and an identifier of the VPN of the client (block 618). Further, the process 600 (e.g., the virtual machine coupler 510) may assign the VLAN identifier to the network interface of the virtual machine (block 620). Upon communicatively coupling the virtual machine to the logical router, the process 600 (e.g., the virtual machine coupler 510) creates and/or initiates a BGP or an EBGP session between the edge router and a router associated with the VPN of the (block 622). The router associated with the VPN may be included within a switching network and may include an interface to the edge router and/or may be included within the VPN of the client. By initiating the BGP session, the process 600 communicatively couples the edge router to the VPN of the client, and thus, communicatively couples the VPN to the virtual machine. In some examples, the example process 600 may communicatively couple the logical router to the VPN of the client by selecting a pre-configured VRF table within a router associated with the VPN. The example process 600 may then configure a route reflector, a route server, and/or a route controller to rewrite route targets associated with BGP VPN routes to communicatively couple to the client VPN to the selected VRF table. Communications may then be initiated between the VPN and the virtual machine (block 624). The example process 600 then loops back when the service request receiver 504 receives a request for a different virtual machine (block 602).

The example process 700 of FIG. 7 migrates a virtual machine from a host located at a first site to a host located at a second site. Multiple example processes 700 may be executed in parallel or series to migrate different virtual machines within the distributive computing network 130 of FIG. 4. Further, in cases where a virtual machine may be migrated to more than one host and/or server, multiple example processes 700 may be executed in parallel or series to migrate the virtual machine.

The example process 700 of FIG. 7 begins when the resource manager 506 of FIG. 5 determines that a virtual machine that is hosted at a first site is to be migrated to a new host at a second site (block 702). In other examples, the resource manager 506 may determine that one or more virtual machines are to be hosted by different resources (e.g., servers) that may be at the same or, alternatively, at different sites. In some examples, the resource manager 506 may determine that resources need to be rebalanced based on usage and/or load or, alternatively, the resource manager 506 may receive a request from a client to migrate the virtual machine.

Next, the example process 700 (e.g., the resource manager 506) determines one or more resources to host the virtual machine at the second site (block 704). The example process 700 (e.g., the resource manager 506) then initializes the second site by partitioning IP address spare for the virtual machine at the second site (block 706). The example process 700 (e.g., the router manager 522) may also partition a router by the assigned IP address space to create a logical router. The example process 700 may also configure the resource(s) and/or interface(s) of the resource(s) to host the virtual machine.

The example process 700 (e.g., the VLAN manager 420) then creates and assigns a VLAN path to the resource(s) that are to host the virtual machine at the second site (block 708). Next, the process 700 (e.g., the distributive computing network manager 524) creates a VPLS VPN from a VLAN path associated with the virtual machine at the first site to the VLAN path at the second site (block 710). The example process 700 (e.g., the virtual machine manager 508) continues by migrating the virtual machine from the first site to the resource(s) at the second site (block 712).

Upon migrating the virtual machine, the example process 700 of FIG. 7 (e.g., the resource manager 506) updates hosting records stored in the service database 512 to reflect the migration (block 714). Next, the example process 700 (e.g., the distributive computing network interface 524) instructs the virtual machine at the second site to transmit an ARP message to update VRF tables in routers with the location and/or route target of the resource(s) hosting the virtual machine (block 716). In other examples, the virtual machine may automatically transmit the ARP message upon being migrated. Alternatively, the example process 700 and/or the virtual machine may transmit a BGP advertisement. The example process 700 (e.g., the resource manager 506) then un-allocates the resources(s) at the first site associated with the migrated virtual machine. Additionally, the example process 700 may disable the VLAN path and/or the logical router at the first site associated with the migrated virtual machine. The example process 700 then loops back for a migration of a different virtual machine (block 702).

Figure 8:
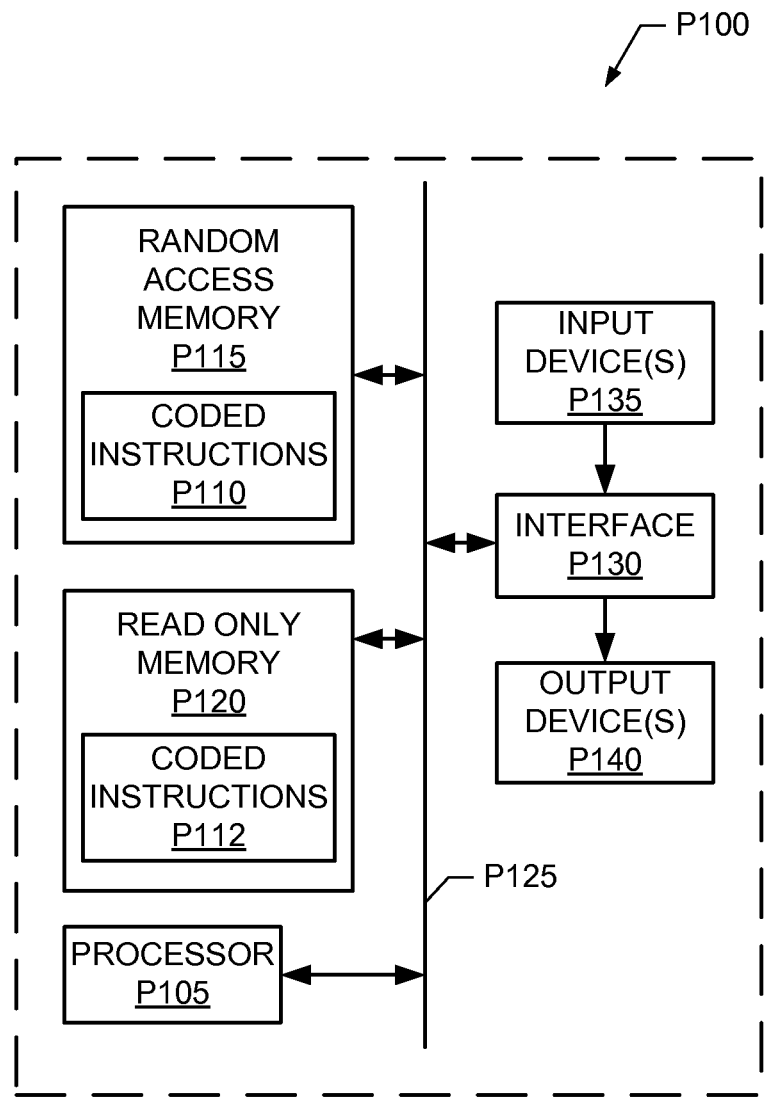
FIG. 8 is a schematic illustration of an example processor platform that may be used and/or programmed to carry out the example processes of FIGS. 6A, 6B, and/or 7 to implement any of all of the methods and apparatus disclosed herein.

FIG. 8 is a schematic diagram of an example processor platform P100 that may be used and/or programmed to implement the example distributive computing network manager 132, the example network manager 104, the example routers 106-110 and/or 144-148, and/or the example servers 134-140 of FIGS. 1-5. For example, the processor platform P100 can be implemented by one or more general-purpose processors, processor cores, microcontrollers, etc.

The processor platform P100 of the example of FIG. 8 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 6A, and/or 6B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example routing service database 512 and/or the example routing table cache 530 of FIG. 5.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example apparatus including software or firmware executed on hardware, it should be noted that such apparatus are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example apparatus, methods and articles of manufacture, the examples are not the only way to implement such apparatus, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to communicatively couple a virtual private network to virtual machines within a distributive computing network, the method comprising:
   receiving, from the virtual private network, a request to provision a virtual machine;
   communicatively coupling the virtual machine to a virtual local area network switch within the distributive computing network;
   configuring a portion of a router to be communicatively coupled to the virtual machine via the virtual local area network switch, wherein configuring the portion of the router comprises specifying an address space within the router associated with at least one of the virtual machine or the virtual private network; and
   communicatively coupling the portion of the router to the virtual private network, wherein communicatively coupling the portion of the router to the virtual private network comprises
      providing the router with a set of virtual private network routing and forwarding tables,
      upon configuring the portion of the router to be communicatively coupled to the virtual machine, selecting a virtual private network routing and forwarding table within the router, and
      rewriting route targets associated with the virtual private network to communicatively couple the virtual private network to the virtual private network routing and forwarding table.

2. The method of claim 1, wherein communicatively coupling the virtual machine to a virtual local area network switch includes:
   assigning an identification value associated with a path within the virtual local area network switch from the address space to the virtual machine by assigning the identification value to a network interface of the virtual machine; and
   updating a routing table within the router to reference the identification value associated with the path within the virtual local area network switch to the address space.

3. The method of claim 1, further comprising:
   receiving, in the router via the virtual local area network switch, first communication packets originating from the virtual machine, the first communication packets including a first destination address;
   determining that the first destination address is at least one of an address included within the address space or an address associated with the virtual private network; and
   forwarding the first communication packets to a computing source associated with the first destination address within the virtual private network.

4. The method of claim 3, further comprising:
   receiving, in the router, second communication packets originating from a computing source within the virtual private network, the second communication packets including a second destination address;
   determining that the second destination address is included within the address space associated with the virtual machine; and
   forwarding, via the virtual local area network switch, the second communication packets to the virtual machine.

5. The method of claim 1, further comprising initiating an external border gateway protocol session between the router and the virtual private network to advertise the address space associated with the virtual machine to the virtual private network.

6. The method of claim 1, wherein the router is communicatively coupled via the Internet to a provider edge router included within the virtual private network.

7. The method of claim 6, wherein the provider edge router includes a virtual private network interface for the virtual private network that corresponds to the virtual machine, wherein the provider edge router transmits, to routers within the virtual private network, border gateway protocol messages including an interface address associated with the virtual private network interface.

8. The method of claim 1, wherein only computing resources associated with the virtual private network are communicatively coupled to the virtual machine via the portion of the router and the virtual local area network switch.

9. The method of claim 1, further comprising:
determining a first host for the virtual machine within the distributive computing network;
creating the virtual machine within the first host;
determining a second host for the virtual machine within a further distributive computing network;
creating the virtual machine within the second host and communicatively coupling the virtual machine to a further virtual local area network switch within the further distributive computing network;
communicatively coupling the virtual local area network switch and the further virtual local area network switch by a virtual private local area network service; and
configuring a portion of a further router to be communicatively coupled to the virtual machine via the virtual private local area network service.

10. The method of claim 1, further comprising:
determining a first host for the virtual machine within the distributive computing network;
creating the virtual machine within the first host;
determining the virtual machine is to be migrated to a different host;
determining a second host for the virtual machine within the distributive computing network;
migrating the virtual machine to the second host;
communicatively coupling the virtual machine to a further virtual local area network switch within the distributive computing network;
configuring a portion of a further router to be communicatively coupled to the virtual machine via the further virtual local area network switch, wherein configuring the portion of the further router comprises specifying a further address space within the second router associated with at least one of the virtual machine or the virtual private network, the virtual private network communicatively coupled to the further router; and
communicatively coupling the portion of the further router to the virtual private network.

11. The method of claim 10, further comprising:
prior to migrating the virtual machine, creating a virtual private local area network service virtual private network from the virtual local area network switch to the further virtual area network switch; and
upon migrating the virtual machine, sending at least one of a border gateway protocol or an address resolution protocol message to update the address space associated with the virtual machine with the further address space.

12. An apparatus to communicatively couple a virtual private network to virtual machines within a distributive computing network, the apparatus comprising:

a processor; and
memory that stores instructions that, when executed by the processor, cause the processor to perform operations comprising
receiving, from the virtual private network, a request to provision a virtual machine,
communicatively coupling the virtual machine to a virtual local area network switch within the distributive computing network,
configuring a portion of a router to be communicatively coupled to the virtual machine via the virtual local area network switch, wherein configuring the portion of the router comprises specifying an address space within the router associated with at least one of the virtual machine or the virtual private network, and
communicatively coupling the portion of the router to the virtual private network, wherein communicatively coupling the portion of the router to the virtual private network comprises
configuring the router with a set of virtual private network routing and forwarding tables,
selecting a virtual private network routing and forwarding table within the router, and
rewriting route targets associated with the virtual private network to communicatively couple the virtual private network to the virtual private network routing and forwarding table.

13. The apparatus of claim 12, wherein communicatively coupling the virtual machine to the virtual local area network switch includes:
assigning an identification value associated with a path within the virtual local area network switch from the address space to the virtual machine by assigning the identification value to a network interface of the virtual machine; and
updating a routing table within the router to reference the identification value associated with the path within the virtual local area network switch to the address space.

14. The apparatus of claim 12, wherein the memory stores further instructions that, when executed by the processor, cause the processor to perform operations comprising initiating an external border gateway protocol session between the router and the virtual private network to advertise the address space associated with the virtual machine to the virtual private network.

15. The apparatus of claim 12,
receiving, via the virtual local area network switch, first communication packets originating from the virtual machine, the first communication packets including a first destination address,
determining that the first destination address is at least one of an address included within the address space or an address associated with the virtual private network, and
forwarding the first communication packets to a computing source associated with the first destination address within the virtual private network.

16. The apparatus of claim 15, wherein the memory stores further instructions that, when executed by the processor, cause the processor to perform operations comprising:
receiving second communication packets originating from a computing source within the virtual private network, the second communication packets including a second destination address;
determining that the second destination address is included within the address space associated with the virtual machine; and forwarding, via the virtual local area network switch, the second communication packets to the virtual machine.

17. The apparatus of claim 12, wherein the memory stores further instructions that, when executed by the processor, cause the processor to perform operations comprising:
   determining a host for the virtual machine within the distributive computing network;
   creating the virtual machine within the host;
   determining the virtual machine is to be migrated to a different host;
   determining a second host for the virtual machine within the distributive computing network;
   migrating the virtual machine to the second host;
   communicatively coupling the virtual machine to a further virtual local area network switch within the distributive computing network; and
   configuring a portion of a further router to be communicatively coupled to the virtual machine via the further virtual local area network switch, wherein configuring the portion of the further router comprises specifying a further address space within the further router associated with at least one of the virtual machine or the virtual private network, the virtual private network, communicatively coupled to the second router.

18. The apparatus of claim 17, wherein the memory stores further instructions that, when executed by the processor, cause the processor to perform operations comprising:
   creating a virtual private local area network service virtual private network from the virtual local area network switch to the further virtual area network switch; and
   upon migrating the virtual machine, sending at least one of a border gateway protocol or an address resolution protocol message to update the address space associated with the virtual machine with the further address space.

19. A tangible computer-readable storage medium storing instructions which, when executed by a processor, cause the processor to perform operations comprising:
   receiving, from a virtual private network associated with a client, a request to provision a virtual machine of a distributive computing network;
   determining an address for the virtual machine;
   allocating an address space on a router to create a logical router, the address space on the router corresponding to the address of the virtual machine;
   creating a virtual local area network path within a virtual local area network switch from the virtual machine to the logical router; and
   communicatively coupling the logical router to the virtual private network of the client, wherein only packets with a destination address corresponding to the address of the virtual machine and a source address associated with the virtual private network of the client are forwarded via the virtual local area network path from the logical router to the virtual machine.

* * * * *